United States Patent
Saito

(10) Patent No.: US 7,160,452 B2
(45) Date of Patent: Jan. 9, 2007

(54) FILTER DEVICE

(75) Inventor: Yasuhiro Saito, Kawasaki (JP)

(73) Assignee: Nihon Genryo Co., Ltd. (JP)

( * ) Notice: Subject to any disclaimer, the term of this patent is extended or adjusted under 35 U.S.C. 154(b) by 0 days.

(21) Appl. No.: 10/523,535

(22) PCT Filed: Jul. 29, 2003

(86) PCT No.: PCT/JP03/09599

§ 371 (c)(1),
(2), (4) Date: Feb. 2, 2005

(87) PCT Pub. No.: WO2004/014513

PCT Pub. Date: Feb. 19, 2004

(65) Prior Publication Data

US 2005/0252843 A1    Nov. 17, 2005

(30) Foreign Application Priority Data

| Aug. 9, 2002 | (JP) | ............................. 2002-232973 |
| Sep. 18, 2002 | (JP) | ............................. 2002-271451 |
| Jan. 23, 2003 | (JP) | ............................. 2003-014293 |

(51) Int. Cl.
*B01D 24/46* (2006.01)
(52) U.S. Cl. ................... 210/270; 210/283; 210/293
(58) Field of Classification Search ................ 210/269, 210/270, 276, 283, 293
See application file for complete search history.

(56) References Cited

U.S. PATENT DOCUMENTS

| 3,623,978 A | * | 11/1971 | Boze et al. .................. 210/732 |
| 4,126,546 A | * | 11/1978 | Hjelmner et al. ............ 210/741 |
| 4,260,426 A | * | 4/1981 | Werfelman ................... 134/29 |
| 4,668,405 A | | 5/1987 | Boze et al. |
| 4,787,987 A | * | 11/1988 | Hensley ....................... 210/792 |
| 4,891,142 A | * | 1/1990 | Hering, Jr. .................. 210/792 |
| 6,319,413 B1 | | 11/2001 | Xia et al. |

FOREIGN PATENT DOCUMENTS

| JP | 31491 | | 9/1917 |
| JP | 59-158413 | * | 10/1984 |
| JP | 63(1988)-98704 | | 6/1988 |
| JP | 8(1996)-215509 | | 8/1996 |
| WO | WO 01/83076 | * | 11/2001 |

* cited by examiner

*Primary Examiner*—Ivars C. Cintins
(74) *Attorney, Agent, or Firm*—Lucas & Mercanti, LLP

(57) ABSTRACT

A filtration device that enables efficient cleansing and rinsing of filtration media within a short time, in which filtration sand is not likely to become clogged, and in which unevenness within filtration sand is not likely to occur comprising a screw conveyor 32 provided within a cleansing tank 38, which is suspended from the upper portion of a filtration tank 2, a space 52 being formed between a filter bed 4 and a wire mesh 50, which are vertically separated, filtration media 14 provided on the wire mesh 50, and filtration media 54, having larger particle sizes than the filtration media 14, provided within the space 52 and a plurality of strainers 12 provided in the filter bed 4 and cleansing water spraying pipes 58 provided on an outer wall surrounding the space 52 and after the screw conveyor 32 is rotated and the filtration media 14 has been cleansed, cleansing water is sprayed from a filtered water discharge pipe 46 and the cleansing water spraying pipes 58, to expel contaminants through a raw water supply pipe 56.

5 Claims, 14 Drawing Sheets

FILTER DEVICE

This application is a 371 of PCT/JP03/09599 filed on Jul. 29, 2003.

TECHNICAL FIELD OF THE INVENTION

The present invention relates to a filtration device for filtering liquids, such as water. Particularly, the present invention relates to a filtration device having a filtration media cleansing mechanism in the interior thereof.

BACKGROUND ART

If filtration devices are utilized for long periods of time, filtration media (filtration sand) within filtration tanks of the filtration devices become clogged. This prevents the performance of efficient filtration, and deteriorates the quality of filtered liquids, such as water. For this reason, clogging is eliminated by removing contaminants, which are attached to the filtration media. In order to perform operations efficiently, it is desirable that the process of removing the contaminants from the filtration media, that is, a cleansing process, be performed in a short amount of time with few steps. It is also desirable that the cleansing process be performed without taking up additional space. For these reasons, it is considered to provide filtration sand cleansing devices (filtration media cleansing mechanisms) within filtration tanks. The provision of cleansing mechanisms within filtration tanks would enable efficient cleansing of filtration media in a short amount of time, without removing the filtration media from within the filtration tanks.

There are known filtration devices, as disclosed in Japanese Patent No. 31491 and Japanese Unexamined Utility Model Publication No. 63 (1988)-98704, which have been developed in view of these points. The filtration device disclosed in Japanese Patent No. 31491 comprises a central pipe (cleansing tank), which is suspended by a frame (support portion). The lower end of the central pipe opens within a filtration chamber (filtration tank). A propeller is provided within the interior of the central pipe, at its lower end. A pipe having a jet expulsion opening is provided above the propeller, the jet expulsion opening being slightly above the upper edge of the central pipe. The pipe having the jet expulsion opening is linked to the propeller, and rotates therewith, to spray cleansing fluid in the horizontal direction by use of centrifugal force. During filtration, water containing contaminants (hereinafter, referred to as "raw water") is supplied from above, and is filtered by passing through filtration sand, which is provided on an apertured false bottom (filter bed). During cleansing, the propeller is rotated, causing filtration sand to be suctioned into the central pipe via the lower opening thereof. The filtration sand is elevated through the central pipe, then discharged in the horizontal direction by the cleansing fluid being sprayed from the jet expulsion opening. The filtration sand is cleansed by contaminants being separated therefrom at this time.

The filtration device disclosed in Japanese Unexamined Utility Model Publication No. 63-98704 comprises an elevating pipe (cleansing tank) erected therein, and a spiral water elevator provided within the elevating pipe. During filtration, water is discharged by a water dispersing tube, which is within filtration sand. Processed water, which has been filtered by passing through the filtration sand from below, is discharged above the filtration sand. During cleansing of the filtration sand, the spiral water elevator rotates and elevates the filtration sand, which has trapped contaminants, from the lower portion of the spiral water elevator. The contaminants are separated from the filtration sand by use of centrifugal force. The filtration sand is expelled through a filtration sand expulsion opening, which is provided in the upper portion of the elevating pipe. The filtration sand then returns to the interior of the filtration tank.

As a further example of a known filtration device, there is that which is disclosed in Japanese Unexamined Patent Publication No. 8 (1996)-215509. This filtration device is configured similarly to that disclosed in Japanese Unexamined Utility Model Publication No. 63-98704, in that raw water is filtered by moving upward through a filtration tank. A cylinder that contains a screw conveyor is suspended from the upper portion of the filtration tank. Filtration sand is cleansed during upward conveyance thereof from the lower end to the upper end of the cylinder by the screw conveyor. The filtration sand, which has been conveyed upward, is further agitated within a separation chamber provided at the upper portion of the cylinder, to remove contaminants therefrom. The cleansed filtration sand is then returned to the upper surface of the filtration media layer. In this filtration device, raw water is caused to flow upward from the bottom thereof during cleansing. That is, filtration is performed continuously, without interruption.

Conventionally, in filtration devices of the type in which raw water is supplied from above and permeates through to the lower portions thereof, configurations are known, in which layers of large diameter gravel is provided on filter beds, and finer sand is provided on top of the gravel layer.

There are cases in which cleansing of filtration media is performed daily, for example, prior to the start of business, or after close of business. In the case that filtration devices are operated 24 hours a day, the degree of clogging by contaminants may be detected with sensors to automatically perform cleansing as necessary. Alternatively, there are cases in which cleansing is automatically performed based on a timer, that operates every predetermined time interval before clogging occurs.

Conventionally, there are also cases in which great numbers of particles are compressed to a degree that spaces remain between the particles, to serve as strainers.

In the filtration device disclosed in Japanese Patent No. 31491, filtration media is provided directly on the apertured false floor. This causes problems in that filtration sand passes through the apertures of the false floor, flow downward, and become mixed into the filtered water. In the case that the water to be filtered contains concentrated contaminants, the apertures may become clogged. During cleansing, contaminants are removed by rotation of the propeller and cleansing water is backwashed toward the filtration sand from the apertured false floor, to separate and expel the contaminants attached to the filtration sand. However, the total area of the plurality of apertures, which are provided in the apertured false bottom, is limited, that is, the open area ratio is low. Therefore, cleansing water cannot be backwashed uniformly onto the filtration sand on the apertured false floor. As a result, the efficiency during rinsing of contaminants from the filtration sand is low, and the cleansing operation requires time.

The filtration devices disclosed in Japanese Unexamined Utility Model Publication No. 63-98704 and Japanese Unexamined Patent Publication No. 8-215509 are of the upward flow type. That is, normal filtration is performed by supplying raw water from a lower supply opening, then causing it to move upward. Upward flow type filtration devices are generally provided for the purpose of processing a great amount of raw water. Therefore, the flow rate is high, causing filtration media toward the upper portion to float. This increases the spaces between the particles of filtration sand, which causes a problem in that contaminants within the water are not sufficiently trapped.

Particularly, the filtration device disclosed in Japanese Unexamined Patent Publication No. 8-215509 does not cease filtration even during cleansing. Therefore, fine light sand is pressed upward, and coarse sand is retained at the lower portion thereof. If filtration media in this state is elevated by the spiral water elevator (screw conveyor), the coarse lower layer of filtration sand is elevated, then discharged onto the sand layer. The coarse sand sinks to the bottom and the fine light sand remains at the upper portion. Accordingly, a problem arises in that only the coarse sand is cleansed, while the fine sand remains contaminated. For this reason, filtration devices that perform continuous filtration have not been put to practical use. In addition, because cleansing water is not backwashed upward from the filter bed, the expulsion of separated contaminants cannot be performed efficiently, which causes the cleansing operation to take time.

In the case that filtration media, in which a layer of fine sand is provided on top of a layer of large diameter gravel, the fine sand is prevented from sinking to the lower portion by the large diameter gravel. There are other advantages, such as apertures in the filter bed being less likely to become clogged, and the flow of liquid being uniform, by being dispersed by the large diameter gravel layer. However, the following problem arises when cleansing filtration media provided in this manner.

In the case that cleansing is performed only by backwash cleansing, in which cleansing water is caused to be sprayed from the filter bed, the cleansing water is sprayed upward through paths, which are not blocked by contaminants, in the layers of filtration media. Therefore, filtration sand in the peripheries of the paths move, causing unevenness in the gravel layer, that is, unevenness at the surface of the gravel layer to be generated. Then, when filtration is performed following cleansing, raw water that flows through the filtration media is not uniformly dispersed, due to paths therefor being skewed by the unevenness. Thereby, the filtration efficiency deteriorates, or the filtration effects do not stabilize. In the case that a screw conveyor is utilized to cleanse the filtration sand above the gravel layer, there is a possibility that the rotation of the screw conveyor will affect the upper portion of the gravel layer, to cause unevenness therein.

In addition, in the case that sand layers are provided on top of gravel layers, three to four layers of gravel and sand of gradually decreasing particle diameters are provided. This is to ensure that fine sand does not drop into the layer of large gravel. In this case, each layer must be of approximately the same thickness. Therefore, the entire layer thickness becomes great, and as a result, the height of the filtration tank also increases. Accordingly, there is a possibility that restrictions will arise in the installation location of the filtration device, if installed indoors. Further, maintenance and management, such as cleansing, of a plurality of different types of filtration media is difficult.

Further, strainers of the type in which great numbers of particles are compressed are likely to become clogged depending on the contaminants, and it is difficult to remove the contaminants that cause the clogging.

SUMMARY OF THE INVENTION

The present invention has been developed in view of the above points. It is an object of the present invention to provide a filtration device, in which clogging is not likely to occur, unevenness in filtration 15 media does not occur, and which maintains stable filtration performance over a long period of time.

It is another object of the present invention to provide a filtration device, in which cleansing and rinsing operations of filtration media are enabled to 20 be performed efficiently in a short amount of time, thereby facilitating maintenance and management thereof.

The filtration device of the present invention comprises:
a filtration tank, having filtration media support members for supporting a layer of first particulate filtration media; and
a cleansing mechanism, comprising:
a vertically oriented hollow cleansing tank provided in the filtration tank;
a cleansing means, for conveying the first filtration media upwards within the cleansing tank while cleansing the first filtration media; and
a contaminant expulsion means, for expelling contaminants separated from the first filtration media during cleansing to the exterior of the filtration tank; wherein:
during normal filtration, liquid which has been filtered by the filtration media is passed through the filtration media support members and discharged therethrough;
the filtration media support members comprises two vertically separated filtration media support members
the upper filtration media support member comprises a great number of liquid passage portions, of a size which is difficult for the first filtration media to pass through; and
a layer of second filtration media, which are greater in size than the first filtration media, is provided between the two filtration media support members.

It is preferable that a configuration be adopted wherein:
the cleansing means comprises a screw conveyor, which is suspended from the upper portion of the filtration tank; and
the screw conveyor is configured to be rotated by a drive portion, which is provided at the upper portion of the filtration tank. It is preferable that the shape of the lower end of the rotating shaft of the screw conveyor is an arcuate surface. Note that the lower end of the rotating shaft of the screw conveyor may be supported from below.

It is also preferable that:
the upper filtration media support member is a mesh member, having mesh openings that constitute the liquid passage portions.

It is preferable that a configuration is adopted wherein:
a plurality of strainers, for discharging the filtered liquid, are provided at the lower of the two filtration media support members. It is preferable that the strainers have umbrella shaped portions at the upper portions thereof, and that slots, for liquid to pass through, are provided in the umbrella shaped portions.

A configuration may be adopted wherein the filtration device further comprises:
liquid spraying portions, for spraying the second filtration media provided between the two filtration media support members from the exterior, provided on the outer wall of the filtration tank; wherein:
cleansing fluid is sprayed toward the layer of the second filtration media by the liquid spraying portions, to separate contaminants attached to the second filtration media by the stream of cleansing fluid.

It is preferable that the liquid spraying portions are provided at an angle within a plane substantially perpendicular to the filter bed. It is also preferable that the liquid spraying portions are provided at substantially equidistant intervals along the outer periphery of the filtration tank.

A configuration may be adopted wherein the filtration device further comprises:

a vibration generating device, for imparting vibration to the second filtration media provided between the two filtration media support members; wherein:

vibration is propagated toward the layer of the second filtration media by the vibration generating device, to separate contaminants attached to the second filtration media by the vibration imparted thereto.

Alternatively, an ultrasonic wave generator may be mounted onto the filtration tank, and the vibration generated by the ultrasonic waves may separate contaminants attached to the second filtration media.

The filtration device of the present invention comprises: the filtration tank having the filtration media support members and the filtration media cleansing mechanism comprising: the hollow cleansing tank; the cleansing means within the cleansing tank; and the contaminant expulsion means. The filtration media support members, for passing filtered water therethrough, comprises two vertically separated filtration media support members. The upper filtration media support member comprises a great number of liquid passage portions, of a size which is difficult for the first filtration media to pass through; and a layer of second filtration media, which are greater in size than the first filtration media, is provided between the two filtration media support members. Therefore, the filtration device of the present invention exhibits the following advantageous effects.

That is, the first and second filtration media are partitioned by the two vertically separated filtration media support members. The first filtration media provided on the upper filtration media support member have smaller diameters than that of the second filtration media provided between the two filtration media support members. Therefore, the smaller first filtration media are prevented from dropping into the second filtration media by the upper filtration media support member. Therefore, the filtration media is that in which clogging is not likely to occur, without providing a great number of layers. In addition, the second filtration media provided between the two filtration media support members is confined within a predetermined sealed space defined by the two filtration media support members. Therefore, unevenness does not occur in the larger diameter second filtration media, even when the smaller diameter first filtration media are cleansed. As a result, uniform filtration is maintained, and the filtration efficiency of the filtration device is improved. Even in the case that a slight amount of the first filtration media drops into the lower layer of the second filtration media through the upper filtration media support member the first filtration media does not pass through the second filtration media. Accordingly, there is no possibility that the filtration media becomes mixed into filtered water. In addition, it is unlikely that clogging by contaminants will occur in the layer of the large diameter second filtration media.

A configuration may be adopted wherein: the cleansing means comprises the screw conveyor, which is suspended from the upper portion of the filtration tank; and the screw conveyor is configured to be rotated by the drive portion, which is provided at the upper portion of the filtration tank. In this case, the first filtration media is enabled to be scrubbed clean by the screw conveyor. Therefore, the first filtration media is enabled to be cleansed easily, which facilitates maintenance and management. In addition, there is no possibility that unevenness will occur in the second filtration media, which is positioned beneath the upper filtration media support member, even it the first filtration media are cleansed by rotating the screw conveyor.

A configuration may be adopted wherein: the upper filtration media support member is a mesh member, having mesh openings that constitute the liquid passage portions. In this case, the open area ratio of the filtration media support member is great. Therefore, clogging does not occur even if the contaminants in the raw water are highly concentrated. Accordingly, filtered liquid is enabled to pass through the upper filtration media support member efficiently. In addition, during backwash cleansing, cleansing water is enabled to be sprayed uniformly from the filtration media support members. Therefore, rinsing efficiency is improved, and rinsing operations can be completed within a short amount of time.

A configuration may be adopted wherein: a plurality of strainers, for discharging the filtered liquid, are provided at the lower of the two filtration media support members. In this case, comparatively large liquid passage portions, through which the larger second filtration media cannot pass, may be formed in the strainers. Therefore, the filtration device can further decrease the likelihood of clogging. In addition, when cleansing water is backwashed, contaminants trapped in the liquid passage portions of the strainers can be easily removed.

A configuration may be adopted wherein the filtration device further comprises: liquid spraying portions, for spraying the second filtration media provided between the two filtration media support members from the exterior, provided on the outer wall of the filtration tank; wherein: cleansing fluid is sprayed toward the layer of the second filtration media by the liquid spraying portions, to separate contaminants attached to the second filtration media by the stream of cleansing fluid. In this case, the second filtration media provided between the two filtration media support members is enabled to be cleansed efficiently in a short amount of time, without being removed from the filtration tank. Thereby, maintenance and management of the filtration apparatus is greatly facilitated.

A configuration may be adopted wherein the filtration device further comprises: a vibration generating device, for imparting vibration to the second filtration media provided between the two filtration media support members wherein: vibration is propagated toward the layer of the second filtration media by the vibration generating device, to separate contaminants attached to the second filtration media by the vibration imparted thereto. In this case also, the second filtration media provided between filtration media support members is enabled to be cleansed efficiently in a short amount of time, without being removed from the filtration tank. Thereby, maintenance and management of the filtration apparatus is greatly facilitated.

In this manner, the filtration device of the present invention is capable of performing cleansing and rinsing of filtration media extremely efficiently. The filtration device of the present invention is capable of completing cleansing operations in approximately a third of the time required by a filtration device that separates contaminants from filtration media using only stream shear of backwash cleansing, for example. Accordingly, in the case that cleansing operations are performed daily, the difference in the total amount of time expended on cleansing operations over a year, that is, the time which is capable of being reduced, becomes extremely great. This advantageous effect is significant from the viewpoints of filtration efficiency and energy consumption for cleansing. Further, the filtration device of the present invention is of the type in which raw water flows downward from above. Therefore, filtration sand does not float due to the flow of water, and contaminants can be stably trapped.

BRIEF DESCRIPTION OF THE DRAWINGS

FIGS. 3A and 3B illustrate a lower filtration media support member, wherein FIG. 3A is a plan view of half of the lower filtration media support member, and FIG. 3B is a sectional view taken along line 3B—3B of FIG. 3A.

FIGS. 4A and 4B illustrate a wire mesh that serves as an upper filtration media support member, wherein FIG. 4A is a plan view of half of the upper filtration media support member and FIG. 4B is a sectional view of the main components of the filtration tank including the wire mesh, taken along line 4B—4B of FIG. 4A.

FIGS. 5A and 5B illustrate a mating portion of two pieces of the wire mesh of FIG. 4, wherein FIG. 5A is a partial magnified view of the mating portion with screws omitted, and FIG. 5B is a magnified sectional view taken along line 5B—5B of FIG. 5A.

FIGS. 6A and 6B illustrate a mounting portion for the wire mesh of the filtration tank, wherein FIG. 6A is a partial magnified plan view, and FIG. 6B is a magnified sectional view taken along line 6B—6B of FIG. 6A.

FIGS. 7A and 7B illustrate a clamp bolt utilized to mount the wire mesh of FIG. 4, wherein FIG. 7A is a magnified plan view of the clamp bolt, and FIG. 7B is a magnified side view of the clamp bolt.

DESCRIPTION OF THE PREFERRED EMBODIMENTS

Figure 1:
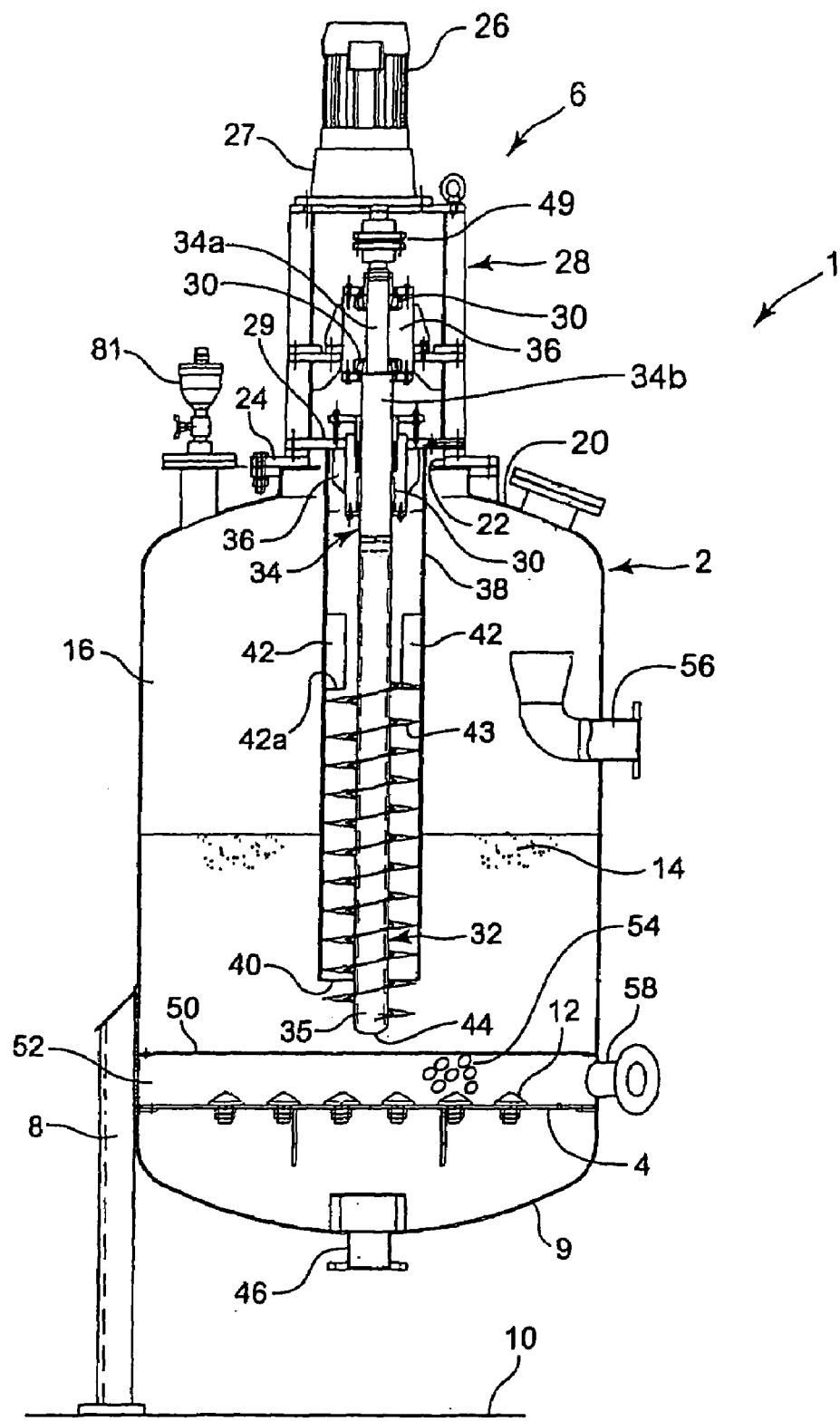
FIG. 1 is a vertical sectional view of a filtration device according to a first embodiment of the present invention.
Figure 2:
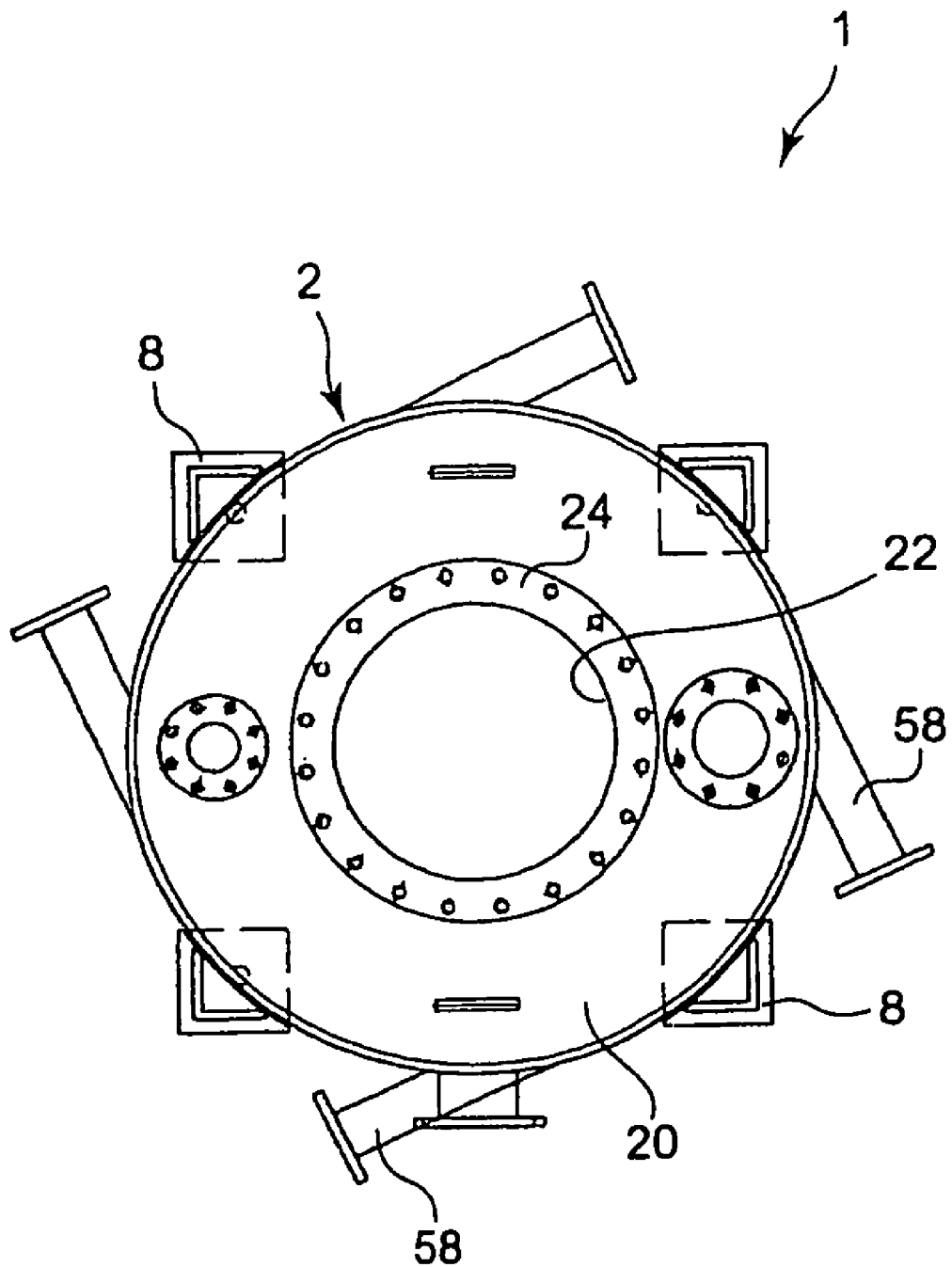
FIG. 2 is a plan view of a filtration tank of the filtration device of FIG. 1.

Hereinafter, the filtration device of the present invention will be described in detail with reference to the attached drawings. FIG. 1 is a vertical sectional view of a filtration device 1 according to a first embodiment of the present invention. FIG. 2 is a plan view of a filtration tank of the filtration device of FIG. 1. A description will be given with reference to FIG. 1 and FIG. 2.

As illustrated in FIG. 1, the filtration device 1 according to the first embodiment of the present invention comprises: a filtration tank 2, which is substantially cylindrical with a sealed top and bottom; horizontally arranged and vertically spaced wire mesh 50 and plates 4, which are provided in the lower portion of the interior of the filtration tank 2; and a filtration media cleansing mechanism 6 (hereinafter, simply referred to as "cleansing mechanism"), which is mounted on a curved upper wall 20 of the filtration tank 2. The cleansing mechanism 6 comprises a motor 26, a brake mechanism 27, a base 28, a cleansing tank 38, and a screw conveyor 32, to be described later. The cleansing mechanism 6 further comprises a filtered water discharge pipe 46, which serves as a contaminant expulsion means, and a raw water supply pipe 56.

Four support legs 8 (only one is illustrated in FIG. 1) are mounted on the filtration tank 2. The support legs 8 set the filtration tank 2 on a floor 10. The plates 4 are provided at a distance from a curved bottom wall 9 of the filtration tank 2. A plurality of strainers 12, for collecting and passing filtered liquid (filtered water) downward, are provided in the plates 4 (refer to FIG. 1). Note that the details of the plates and the strainers 12 will be described later. The raw water supply pipe 56 illustrated in FIG. 1 is positioned at the right side of the filtration tank 2 and is of an L-shape with its supply opening facing upward. However, the supply pipe may be formed in other shapes.

A layer of filtration media 14 (filtration sand), for filtering the raw water supplied by the raw water supply pipe 56, is provided on the wire mesh 50. The wire mesh 50 has a mesh size smaller than the particles of the filtration media 14, in order to prevent the filtration media 14 from dropping downward therethrough. Specifically, the filtration media 14 have particle diameters of approximately 0.4 mm to 2 mm. It is preferable that the particle diameters of the filtration media 14 are within a range of 0.6 mm to 1 mm. The mesh size is set to dimensions that do not allow filtration media 14 having a maximum diameter of approximately 2 mm to pass downward therethrough. The detailed structure of the wire mesh will be described later.

A layer of gravel having greater diameters filtration media 14, that is, a layer of filtration media 54 (support layer) is provided within a space 52 between the mesh 50 and the plates 4. The filtration media 54 is utilized as a support member for supporting the filtration media 14. Particles having diameters within a range of approximately 2 mm to 4 mm are selected as the filtration media 54. Accordingly, raw water that flows from above passes through the layer of filtration media 14, the wire mesh 50, the layer of filtration media 54, and the strainers 12, to flow downward from the plates 4 as filtered liquid. The entirety of the layer of filtration media 54 is covered by the wire mesh 50, and is incapable of moving toward the layer of filtration nmedia 14. Therefore, unevenness is not generated therein, the flow of water is dispersed, and uniform filtration is possible. In the case of the present embodiment, the height of the filtration tank 2 is approximately 2 meters, and the height of the space 52 is approximately 13 cm.

A circular mounting opening 22 is formed in the central portion of the upper wall 20 of the filtration tank 2. The cleansing mechanism 6 is mounted to the mounting opening 22 by bolts (not shown). The peripheral edge of the mounting opening 22 is formed into a mounting rim 24. The base 28, on which the motor 26 and the brake mechanism 27 is provided, is mounted on the rim 24 (refer to FIG. 1). A holding portion 36, comprising a plurality of bearings 30, is formed in the base 28. A shaft 34 of the screw conveyor 32 (cleansing means) is supported by the bearings 30 so as to be rotatable without axial displacement. Note that the motor 26 and the brake mechanism 27 are collectively referred to as a drive portion.

Next, the cleansing mechanism 6 will be described in detail. The cylindrical cleansing tank 38 of the cleansing mechanism 6 has a discoid mounting wall 29 at the upper portion thereof. The mounting wall is mounted onto the rim 24 along with the base 28 by bolts (not shown). In the drawings, the bolts will be indicated by central lines that indicate their positions. When the upper portion of the cleansing tank 38 is mounted onto the rim 24 in this manner, substantially the entirety of the cleansing tank 38 becomes suspended from the upper portion of the filtration tank 2.

As illustrated in FIG. 1, the lower portion of the cleansing tank 38 is an open circular lower opening 40. A plurality of vertically extending upper openings 42 are formed at predetermined intervals along the outer periphery of the upper portion of the cleansing tank 38. The positional relationship between the lower opening 40 and the filtration media 14 is determined such that the lower opening 40 is positioned within the filtration media 14. The screw conveyor 32 is provided in the interior of the cleansing tank 38. The shaft 34 of the screw conveyor 32 is constituted by a small diameter portion 34*a*, having a relatively small diameter, and a large diameter portion 34*b*, having a relatively large diameter.

The shaft 34 is linked to the motor 26 via a coupling 49. The large diameter portion 34*b*, provided to impart strength to the shaft 34, is formed as a hollow pipe, with a sealed lower end 44. It is preferable for the lower end 44 to be formed into an arcuate surface, such as a spherical surface. By forming the lower end 44 into an arcuate surface, vortices are prevented from being generated during rotation of the screw conveyor 32 to perform cleansing. Thereby, unnecessary agitation of filtration media 14 that contact the lower end 44 can be prevented. A spiral screw blade 43 is formed on the large diameter portion 34*b* of the shaft 34. The blade 43 is formed so that it extends to the vicinity of the lower end 44 of the shaft 34.

When the blade 43 of the screw conveyor 32 is arranged within the cleansing tank 38 in this manner, the upper end of the blade 43 is positioned in the vicinity of lower edges 42*a* of the upper openings 42, as illustrated in FIG. 1. In addition, the lower end portion 35 of the screw conveyor 32 protrudes downwardly from the lower opening 40 of the cleansing tank 38, and the lower end 44 of the shaft 34 is positioned in the vicinity of the wire mesh 50. The reason for this positioning is to enable efficient upward conveyance of filtration media 14 in the vicinity of the wire mesh 50, during cleansing of the filtration media 14.

The outer edge of the blade 43 is placed so as to form a slight gap between it and the inner peripheral surface of the cleansing tank 38. The dimension of the gap is approximately three times the particle diameter of the filtration media 14. The gap is provided to reduce the possibility of the filtration media 14 being crushed, in the case that the filtration media 14 is trapped between the blade 43 and the cleansing tank 38.

Next, the components of the filtration device 1, which are attached to the exterior of the filtration tank 2, will be described. The downwardly extending filtered water discharge pipe 46 is mounted at the center of the curved bottom wall 9 of the filtration tank 2. Liquid, which has passed through the filtration media 14, the wire mesh 50, the filtration media 54, and the strainers 12, and which has been filtered thereby, is discharged through the filtered water discharge pipe 46. Cleansing water spraying pipes 58 (liquid spraying portions) are mounted on the exterior wall of the filtration tank 2 between the wire mesh 50 and the plates 4. An air venting valve 81, for expelling air from within the filtration tank 2, is provided on the upper portion of the filtration tank 2.

As most clearly illustrated in FIG. 2, the cleansing water spraying pipes 58 are mounted at four locations having equidistant intervals therebetween along the outer periphery of the filtration tank 2. The cleansing water spraying pipes 58 are mounted at an angle with respect to the outer wall of the filtration tank 2. Cleansing water is powerfully sprayed from the exterior of the filtration tank 2 toward the interior thereof, so as to create a vortex therein. This powerful flow of water separates contaminants from the filtration media 54 within the space 52, to cleanse the filtration media 54. The cleansing water may be filtered water routed from the filtered water discharge pipe, or it may be cleansing water supplied from a different source (not shown). The details of this cleansing will be described later.

Figure 3A:
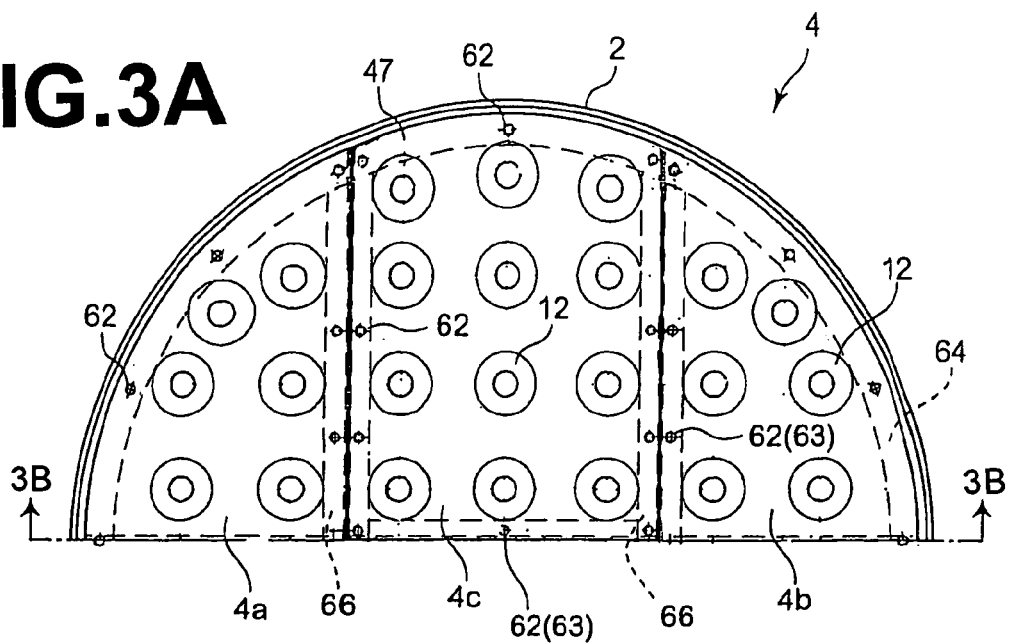
Figure 3B:
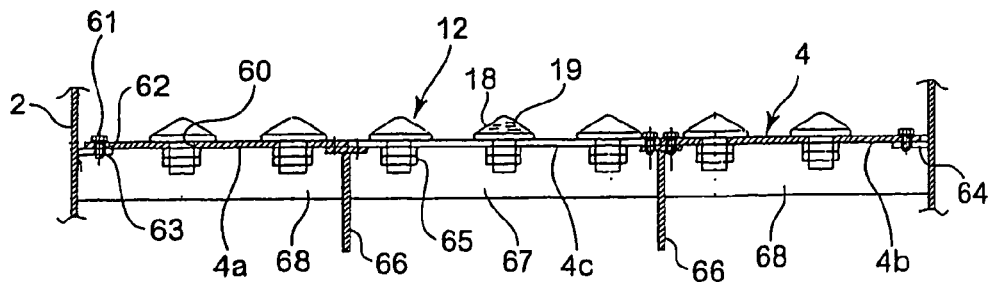

Next, the plates 4 will be described with reference to FIGS. 3A and 3B. FIGS. 3A and 3B illustrate the plates 4, wherein FIG. 3A is a plan view of half of the plates 4, and FIG. 3B is a sectional view of the plates, taken along line 3B—3B of FIG. 3A. The plates 4 are constituted by four plates of stainless steel, for example. That is, the plates 4 is constituted by a pair of half moon shaped portions 4*a* and 4*b* (only half of the half moon shaped portions 4*a* and 4*b* are illustrated in FIG. 3A) and a pair of substantially rectangular portions 4*c* (only one substantially rectangular portion 4*c* is illustrated in FIG. 3A). Accordingly, the plates 4 are of a discoid shape, which is linearly symmetrical about the diameter illustrated in FIG. 3A. One edge of each of the substantially rectangular portions 4*c* is formed as an arcuate portion 47.

A great number of apertures 60 are provided in the plates 4. The aforementioned strainers 12 are provided in the apertures 60. In addition, a plurality of small apertures 62, for securing screws therein, are provided along the outer peripheries of each of the portions 4*a*, 4*b*, and 4*c*. Meanwhile, an annular mounting ring 64 is provided along the inner periphery of the filtration tank 2. Threaded apertures 63 that correspond to the small apertures 62 are formed in the mounting ring 64. Further, support beams 66 having T-shaped cross sections are mounted within the filtration tank 2, along the seams among the portions 4*a*, 4*b*, and 4*c*. Threaded apertures 63 are also formed in the support beams 66. Screws 61 are screwed through the small apertures 62 and into the threaded apertures 63, to fix the portions 4*a*, 4*b*, and 4*c* to the mounting ring 64 and the support beams 66.

A support beam 67 having a T-shaped cross section is linked to the support beams 66 and provided perpendicular thereto, at the center of a portion that corresponds to the diameter of the filtration tank 2. Threaded apertures 63 are also formed in the support beam 67. The portions 4*c* are fixed to the support beam 67 by the threaded apertures 63. Support beams 68 are also provided on either side of the support beam 67 in FIG. 3*b*. However, the support beams 68 serve only to support the load of the portions 4*a* and 4*b*, and the portions 4*a* and 4*b* are not fixed to the support beams 68.

Next, the strainers, which are provided in the plates 4, will be described. The strainers 12 are commercially available under the product name "AB Strainer", and are formed of ABS resin. The strainers 12 are formed as pipes whose end portions 18 are shaped as hollow umbrellas. A plurality of narrow concentric slots 19 (liquid passage portions), through which the filtration media 54 cannot pass, are formed in each of the umbrella shaped portions 18. The slots 19 allow only filtered liquid to pass downward through the plates 4.

Note that the slots 19 are illustrated only in the central strainer 12 of FIG. 3B. Threads are formed in the pipe portions. Nuts 65 threadedly engage the threads of the pipe portions, and fix the strainers 12 to the plates 4 in cooperation with the umbrella shaped portions 18. The slots 19 need to be of a size that does not allow the filtration media 54, which are larger than the filtration media 14. Therefore, the slots 19 can be formed to be of widths in which clogging by contaminants is unlikely to occur. The advantageous effects obtained by forming the slots 19 in the umbrella shaped portions 18 will be described later.

Figure 4A:
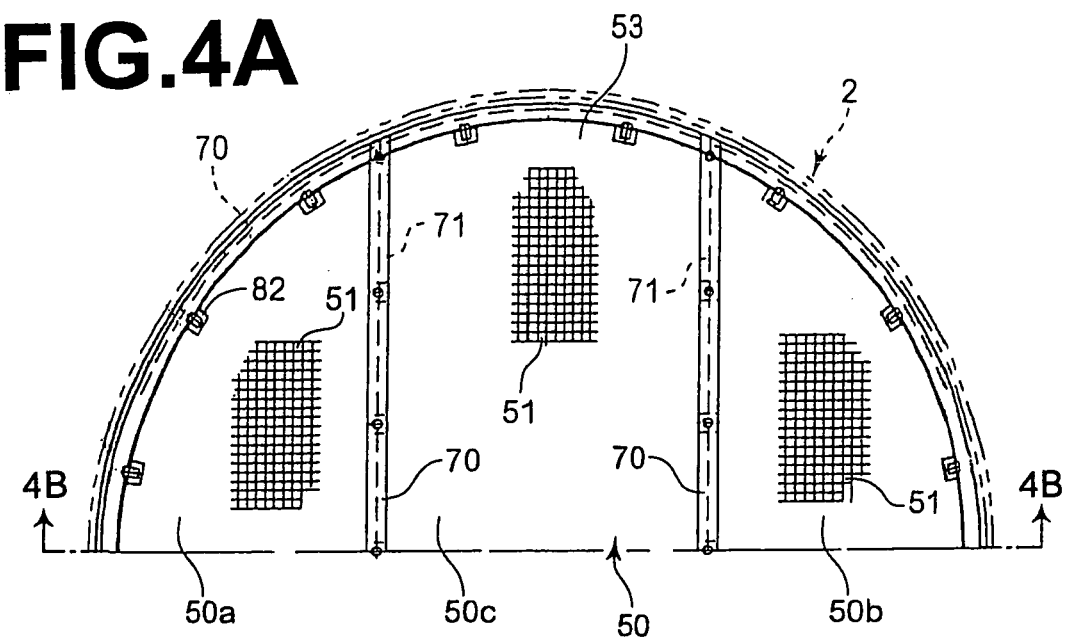
Figure 4B:
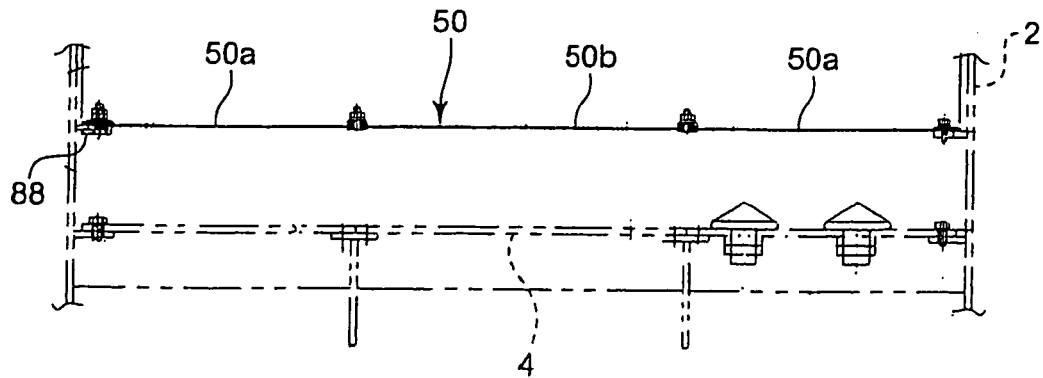
Figure 5A:
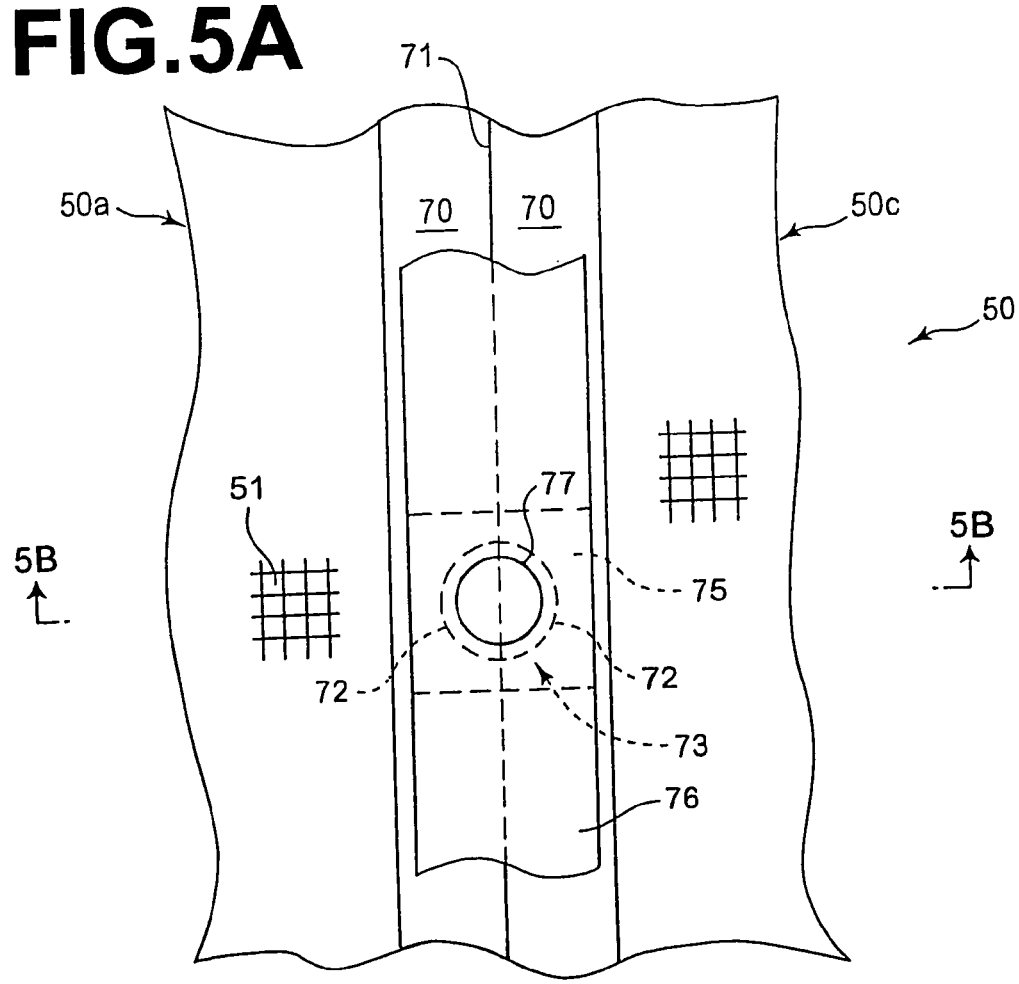
Figure 5B:
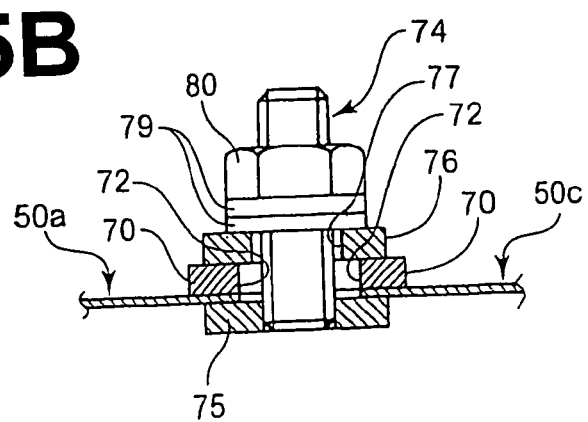
Figure 6A:
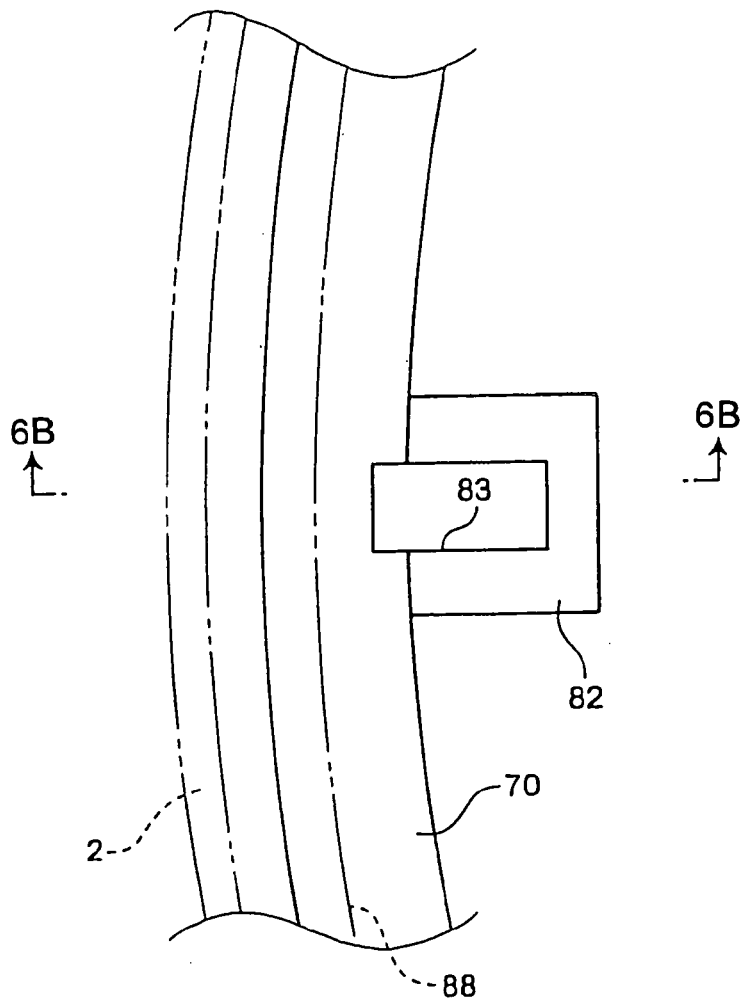
Figure 6B:
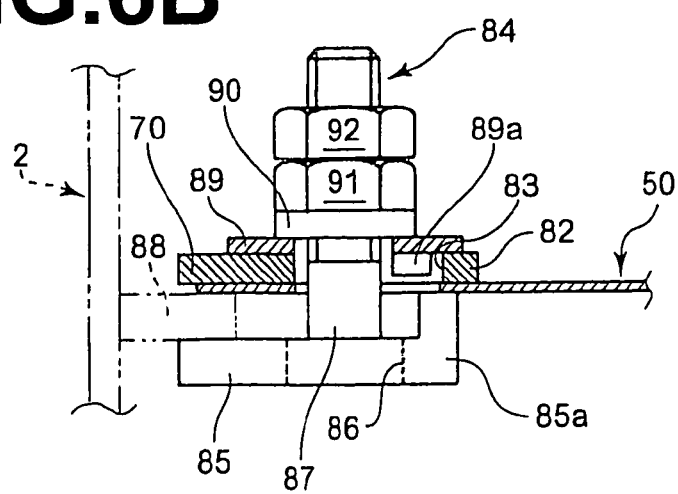
Figure 7A:
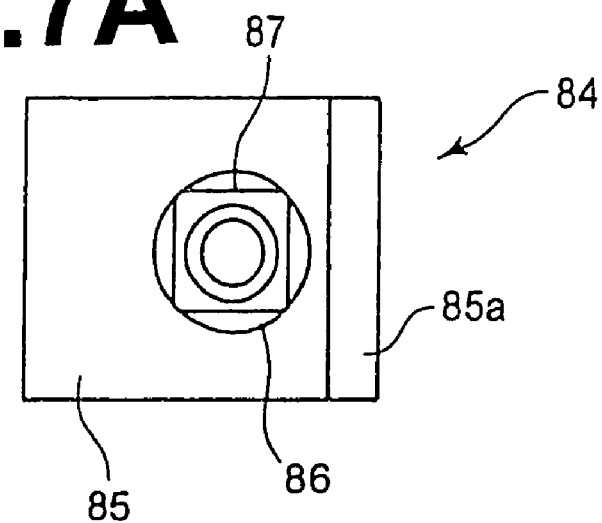
Figure 7B:
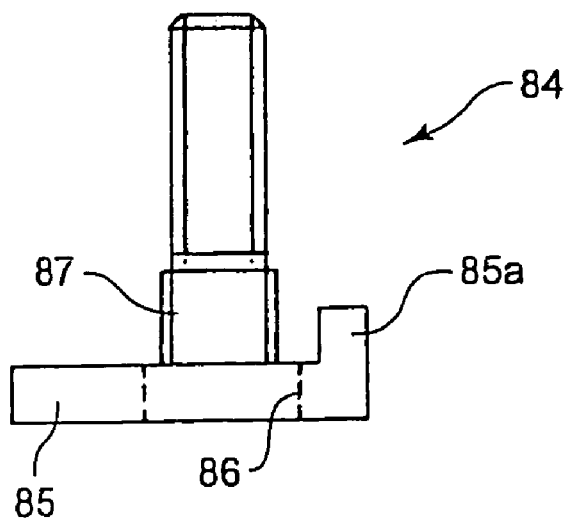

Next, the wire mesh 50 will be described in detail, with reference to FIGS. 4A, 4B, 5A, 5B, 6A, 6B, 7A, and 7B. FIGS. 4A and 4B illustrate the wire mesh 50 mounted within the filtration tank 2, wherein FIG. 4A is a plan view of half of the wire mesh 50, and FIG. 4B is a sectional view of the main components of the filtration tank 2 including the wire mesh 50, taken along line 4B—4B of FIG. 4A. FIGS. 5A and 5B illustrate a mating portion of two pieces of the wire mesh 50, wherein FIG. 5A is a partial magnified view of the mating portion with screws omitted, and FIG. 5B is a magnified sectional view taken along line 5B—5B of FIG. 5A. FIGS. 6A and 6B illustrate a mounting portion for the wire mesh 50 of the filtration tank 2, wherein FIG. 6A is a partial magnified plan view, and FIG. 6B is a magnified sectional view taken along line 6B—6B of FIG. 6A. FIGS. 7A and 7B illustrate a clamp bolt utilized to mount the wire mesh 50, wherein FIG. 7A is a magnified plan view of the clamp bolt, and FIG. 7B is a magnified side view of the clamp bolt.

First, with reference to FIG. 4A, the wire mesh 50 is constituted by three planar stainless steel portions. That is, the wire mesh 50 is constituted by two half moon shaped portions 50a and 50b, and a single substantially rectangular portion 50c, which has opposing arcuate portions 53. Each of the portions 50a, 50b, and 50c have lattice shaped mesh openings 51 (liquid passage portions) and stainless steel frames 70 along the peripheral edges thereof. The mating portions 71, at which the frames 70 of each of the portions 50a, 50b, and 50c abut, are the same for all of the portions. Therefore, the mating portion 71 between the portions 50a and 50c will be described with reference to FIGS. 5A and 5B.

As illustrated in FIG. 5A, opposing semicircular cutouts 72 are formed in the frame 70 of the portion 50a and the frame 70 of the portion 50c so that they are aligned with each other. A circular opening 73 is formed in the abutting frames 72, by the pair of cutouts 72. A screw 74 having a rectangular flange 75 is inserted through the opening 73 from the underside of the wire mesh 50. A frame pressing plate 76 that extends along the length of the frame 70 is mounted onto the screw 74. The frame pressing plate 76 has a threaded aperture 77, and the screw 74 is inserted through the aperture 77. A washer 79 and a nut 80 are mounted onto the screw 74, to fix the screw 74 to the frames 70. Thereby, the portion 50a and the portion 50c are integrally joined.

The circular wire mesh 50 constructed in this manner is then mounted within the filtration tank 2. The structure of this mounting configuration will be described with reference to FIGS. 6A, 6B, 7A, and 7B. As illustrated in FIG. 6A, inwardly protruding tabs 82 are formed on the outer peripheral frames 70 of the wire mesh 50 at predetermined intervals. A long hole 83 that extends in the radial direction of the wire mesh 50 is formed in each of the tabs 82. The wire mesh 50 is fixed to the filtration tank 2 by mounting clamp bolts 84 onto these tabs 82.

The clamp bolts 84 are rectangular in plan view, as illustrated in FIG. 7A, and have an L-shaped head portion 85 when viewed from the side, as illustrated in FIG. 7B. A circular opening 86 is formed in the head portion 85. A bolt is welded in the opening 86, to constitute the clamp bolt 84, which is illustrated in its entirety in FIGS. 7A and 7B. A chin portion 87 of the clamp bolt 84 is formed as a square block.

Referring again to FIGS. 6A and 6B, a mounting ring 88 (refer to FIG. 6B) is provided along the inner periphery of the filtration tank 2. The clamp bolts 84 are mounted onto the frames 70 of the wire mesh 50. At this time, the clamp bolts 84 are mounted onto the frames 70 such that protruding portions 85a of the head portions 85 are oriented away from the mounting ring 88. The mounting ring 88 is sandwiched between the clamp bolts 84 and the wire mesh 50, washers 89 and 90 are mounted, and nuts 91 and 92 fix the wire mesh 50 to the mounting ring 88. Square protrusions 89a, which are positioned within the long holes 83, are provided on the lower surfaces of the washers 89. By this configuration, the frames 70 are positioned in the radial direction of the filtration tank 2 with respect to the clamp bolts 84. Thereby, the wire mesh is held within the filtration tank, without shifting in the radial direction.

Figure 13:
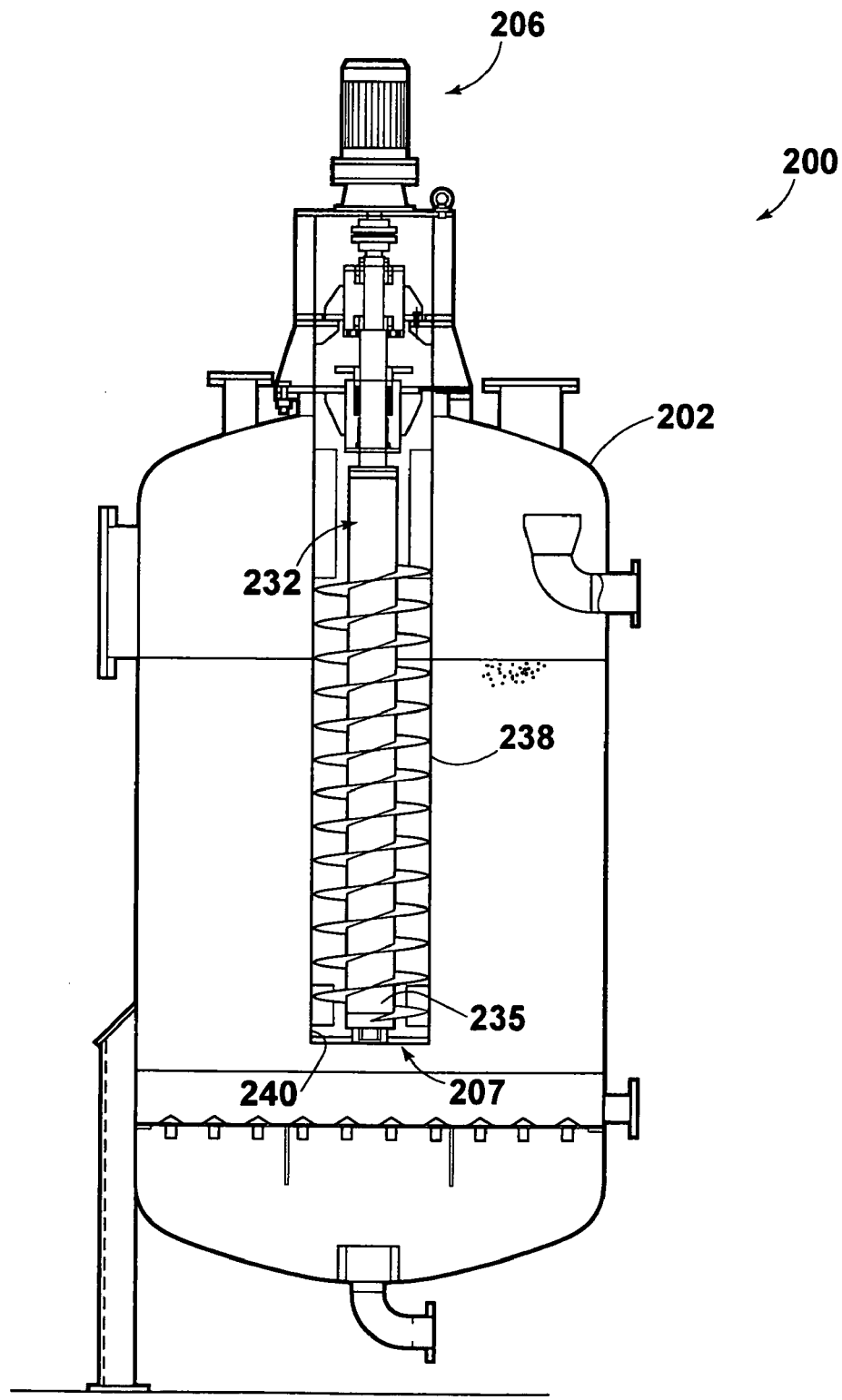
FIG. 13 is a vertical sectional view of a modification of the filtration device of FIG. 1.
Figure 14:
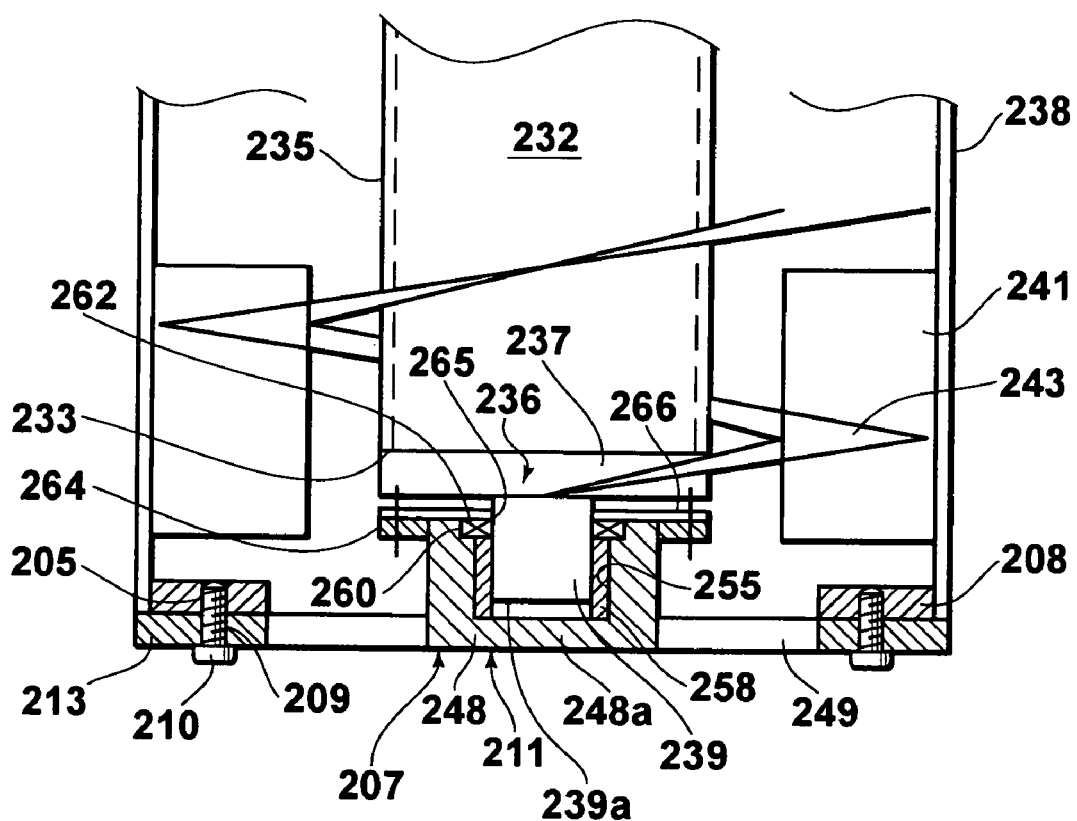
FIG. 14 is a magnified view of the main components of the filtration device of FIG. 13.

Next, a modification of the filter device 1 illustrated in FIG. 1 will be described with reference to FIGS. 13 and 14. FIG. 13 is a vertical sectional view of a modification of the filtration device 1 of FIG. 1. FIG. 14 is a magnified view of the main components of the filtration device 200 of FIG. 13. The modified filtration device 200 comprises: a filtration tank 202; a filtration media cleansing mechanism 206; a cleansing tank 238, which is connected to the filtration media cleansing mechanism 206; and a screw conveyor 232, which is provided within the cleansing tank 238. The main point of difference between the filtration device 200 and the filtration device 1 illustrated in FIG. 1 is that the screw conveyor 232 and the cleansing tank 238 are engaged with each other at the lower ends thereof. In other words, a lower end portion 235 of the screw conveyor 232 is supported by a support member 207, which is provided at the lower end of the cleansing tank 238. In this modification, axial displacement and vibrations during rotation of the screw conveyor 232 is prevented, because the screw conveyor 232 is supported by the support member 207.

The support structure of the screw conveyor 232 will be described further, with reference to FIG. 14. A metallic shaft member 236 is welded onto a lower end 233 of the screw conveyor 232. The shaft member 236 comprises: a discoid base portion 237; and a shaft 239, which is integrally formed with the base portion 237 at the center thereof. The central axes of the shaft 239 and the screw conveyor 232 are coaxial.

Meanwhile, an annular plate, that is, a ring 208 is fixed by welding to the lower end of the cylindrical cleansing tank 238. A plurality of threaded apertures 205 are provided at uniform intervals along the circumference of the ring 208. The support member 207 is mounted onto the ring 208. The support member 207 comprises: an annular mounting ring 213, in which apertures 209 that correspond to the threaded apertures 205 are formed; a housing 248, for hosing the shaft 239; and a plurality of radial stays 249 that connect the housing 248 with the mounting ring 218. The support member 207 is fixed to the threaded apertures 205 of the ring 208 by screws 210.

The housing 248 has a recess 255, which is defined by an upwardly open circular inner wall and a bottom wall 248a. The center of the recess 255 and the rotational center of the screw conveyor 232 are matched. A cylindrical bearing 258 is provided flush with the inner wall of the recess 255. The inner diameter of the bearing 258 is set to a size that fittingly couples with the shaft 239. An annular step portion 260 is formed at the open end of the recess 255, and a sealing member 262, which is in close contact with the shaft 239, is provided at the annular step portion 260. An annular flange 264 is formed on the outer periphery of the upper end of the housing 248. A pressing plate 266 is fixed to the flange 264 by screws (not shown), to prevent the sealing member 262 from being extracted. An opening 265, for receiving the shaft 239, is formed in the pressing plate 266. Therefore, the pressing plate 266 does not interfere with the screw conveyor 232.

The screw conveyor 232 is supported by the support member 207 in the manner described above. Therefore, when the screw conveyor 232 is rotated, the shaft 239 rotates while supported by the bearing 258, thereby preventing axial displacement of the lower end portion 235. It is preferable that a lower end 239a of the shaft 239 is separated from the bottom wall 248a. This configuration is preferred because no downward load is applied to the shaft 239, and the separation from the bottom wall 248a prevents frictional resistance during rotation.

It is preferable that the bearing 258 is that which is formed by an ethylene tetrafluoride resin containing filler material, such as Oiles Glitron F™. However, the material may be any other appropriate synthetic resin, or a metal. Ethylene tetrafluoride resin has superior wear resistance and low frictional coefficient, and is suited as the bearing for the filtration device 200. In addition, ethylene tetrafluoride resin is in compliance with the Food Sanitation Law. Therefore, it is suitable for cases in which filtered water is utilized as drinking water and the like.

Next, referring again to FIG. 1, the manner in which filtration is performed within the filtration tank 2 will be described. First, raw water is supplied into the filtration tank 2 from the raw water supply pipe 56. As the water level of the raw water rises, air within the filtration tank 2 is expelled through the air venting valve 81. In the present embodiment, the water level is set such that it is higher than the raw water supply pipe 56 and reaches the upper portion of the filtration tank 2. That is, the water level is set such that substantially the entirety of the filtration tank 2 is filled with water 16 (raw water). The raw water permeates the filtration media 14. The raw water also enters the cleansing tank 38 through the upper openings 42, to permeate the filtration media 14 within the cleansing tank 38, to enable filtration within the cleansing tank 38 as well.

The water, which has permeated the filtration media 14 and has been filtered thereby, passes through the wire mesh 50, permeates the layer of filtration media 54, passes through the plates 4 via the strainers 12, and is discharged to the exterior through the filtered water discharge pipe 46 at the lower portion of the filtration tank 2, to be provided for use.

Next, a cleansing method for cleansing the filtration media 14 when clogging is generated therein after a long period of use will be described. First, filtered water is backwashed from the filtered water discharge pipe 46, to cause filtered water to spray into the filtration media 14 through the filtration media 54. The flow of filtered water causes the filtration media 14 to float. Thereby, the load on the motor 26 during startup thereof is reduced. Next, the motor 26 is driven, and the screw conveyor 32 is caused to rotate. The filtration media 14 is pressed upward into the cleansing tank 38 by the blade 43 of the screw conveyor 32, and particularly by the portion of the blade 43 that protrudes below the cleansing tank 38.

The backwash of filtered water is continued during the initial stage of rotation of the screw conveyor 32. This is because mixing of the filtration media 14 at the radially outer and inner portions of the cleansing tank 38 is facilitated by rotating the screw conveyor 32 in the backwash cleansing state, due to centrifugal force of the screw conveyor 32. At the same time, the entirety of the filtration media 14 is thoroughly cleansed by this movement. Thereafter, the backwash of filtered water is continued at an extremely low speed, by reducing the flow rate to a degree that does not cause contaminants to drop into the strainers 12. The rotation of the screw conveyor 32 is continued, in order to cleanse the filtration media 14.

The particles of the filtration media 14 are conveyed upward by the rotation of the screw conveyor 32 while rubbing against and scrubbing each other, and are discharged from the upper openings 42 to the exterior of the cleansing tank 38. Separation of contaminants from the filtration media 14 is enhanced by the impact of the filtration media 14 with the surface of the water within the filtration tank 2. The filtration media 14 which has dropped back into the filtration tank 2 is conveyed upwards into the cleansing tank 38 repeatedly, and scrubbed therein. In this manner, contaminants are separated from the filtration media 14 by repetitive cleansing within the cleansing tank 38. As illustrated in FIG. 1, the lower end 44 of the screw conveyor 32 is positioned in the vicinity of the wire mesh 50. Therefore, the filtration media 14 in the vicinity of the wire mesh 50 is conveyed upward as well, thereby thoroughly cleansing the entirety of the filtration media 14.

When cleansing is complete, filtered water is backwashed again from the filtered water discharge pipe 46, to perform a rinsing operation. The backwash rinsing operation is continued after the screw conveyor 32 ceases to rotate. The liquid, which is backwashed from the filtered water discharge pipe 46, sprays into the layer of filtration media 54 through the slots 19 of the strainers 12 within the plates 4. The liquid further passes through the wire mesh 50 and rises into the layer of filtration media 14. Contaminants, which are trapped in the strainers 12, are also easily removed through the slots 19 by the backwash flow of liquid.

The contaminants, which are separated from the filtration media 14, float and are expelled to the exterior along with water that contains contaminants. The cleansing water is also effectively backwashed through the interior of the cleansing tank 38, by passing through the gap of the blade 43. Therefore, contaminants within the cleansing tank 38 are expelled as well. During the backwash rinsing, the cleansing water sprayed from the slots 19 of the strainers 12 uniformly permeate the layer of filtration media 54. That is, the slots 19 are formed in the umbrella shaped portions 18 of the strainers 12. Therefore, the cleansing water is sprayed over a wide range in the peripheries of the strainers 12 at different angles. For this reason, the cleansing operation and the rinsing operation can be effectively performed.

During the rinsing operation, cleansing water is powerfully sprayed between the wire mesh 50 and plates 4 of the filtration tank 2 from the cleansing water spraying pipes 58. The sprayed cleansing water form a vortex flow within the layer of filtration media 54. Contaminants attached to the filtration media 54 are separated therefrom, by exposure to this vortex flow of water. The separated contaminants pass through the wire mesh 50 and are caused to flow upward.

The contaminants are prevented from dropping below the plates 4, because filtered water from the filtered water discharge pipe 46 is being sprayed through the strainers 12. The cleansing water, which is sprayed from the slots 19, is useful in effectively expelling the contaminants separated from the filtration media 54 upward at this time as well. By continuing the backwash rinsing for a necessary amount of time, all of the contaminants are removed from the filtration tank 2. Note that specifics of each of the steps taken from a filtration process to a cleansing process and back to the filtration process will be described later.

In the case of the modified filtration device 200 illustrated in FIGS. 13 and 14, the filtration media 14 is cleansed in by the same cleansing process as that for the filtration device 1 of FIG. 1. However, the behavior of the filtration media during cleansing is slightly different. Therefore, the difference will be described hereinbelow.

In the case of the screw conveyor 232 of the filtration device 200, the lower end portion 235 thereof does not protrude downward from the cleansing tank 238. For this reason, rectangular lower openings 241 (refer to FIG. 14) are formed at the lower portion of the cleansing tank 238, in order to facilitate suction of the filtration media 14 into the cleansing tank 238. A predetermined number of the lower openings 241 are formed in the periphery of the cleansing tank 238 at equidistant intervals.

Filtered water is sprayed in the initial step of the cleansing process, to cause the filtration media 14 to float. Then, the screw conveyor 232 is rotated. At this time, the floating filtration media 14 enters the cleansing tank 238 through the lower openings 241. The filtration media 14, which have entered through the lower openings 241, are conveyed upward by a blade 243, while rubbing against and scrubbing each other. During backwash rinsing, the filtered water enters the cleansing tank 238 from between the stays 249 as well as through the lower openings 241. Thereby, the filtration media 14 within the cleansing tank 238 is also caused to float. The other operations of the filtration device 200 are the same as that of the filtration device 1 of FIG. 1.

Figure 8:
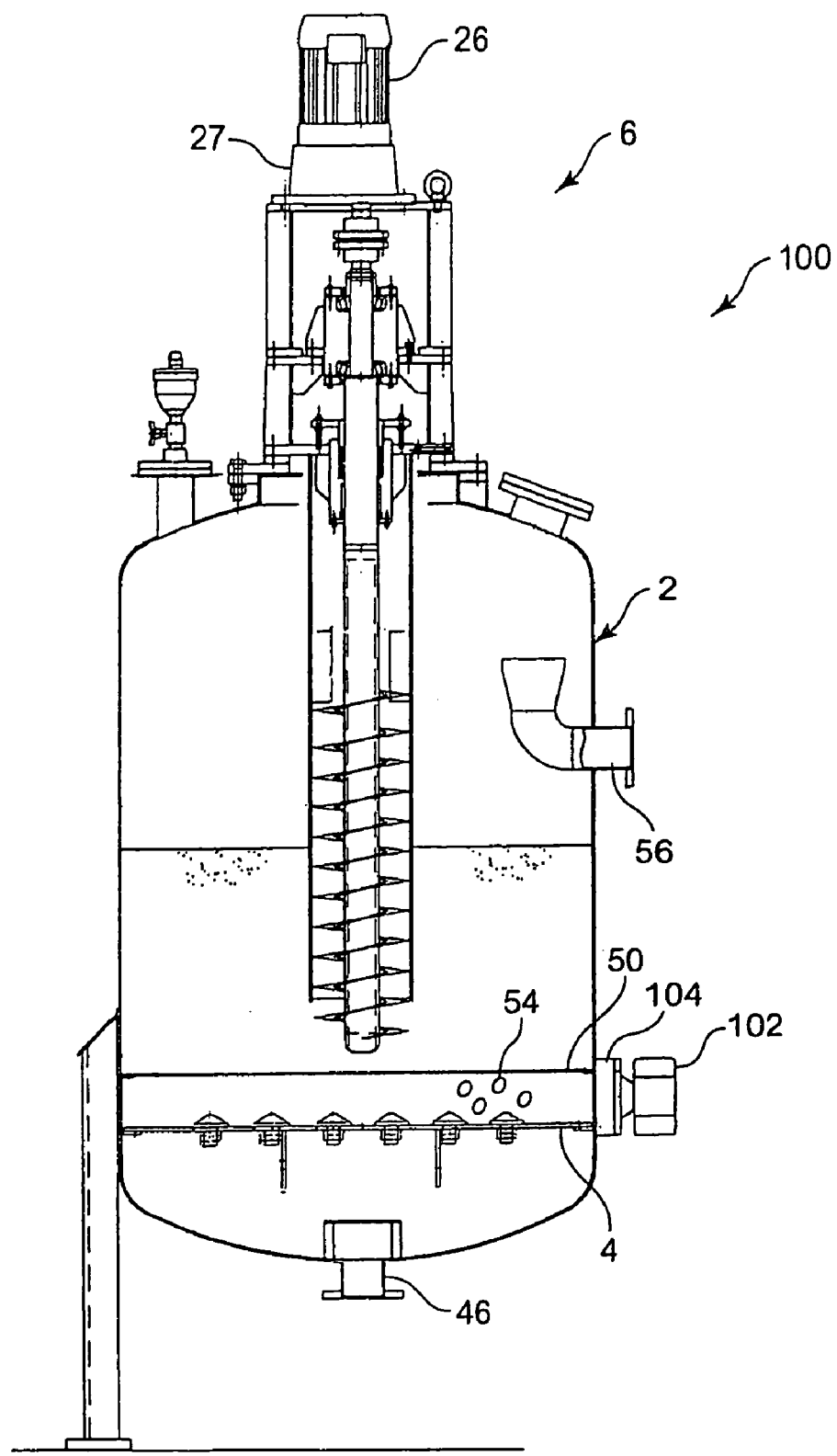
FIG. 8 is a vertical sectional view of a filtration device according to a second embodiment of the present invention.

Next, a filtration device according to a second embodiment of the present invention will be described with reference to FIG. 8. FIG. 8 is a vertical sectional view of a filtration device 100 according to the second embodiment of the present invention. Note that components of the filtration device 100 which are the same as those of the first embodiment are denoted with the same reference numerals. The main difference between the filtration device 100 of the second embodiment and the filtration device 1 of the first embodiment is that a vibration generator 102 is mounted on the outer wall of the filtration tank between the wiremesh 50 and plates 4. Note that only one vibration generator is illustrated in FIG. 8.

The vibration generator 102 is mounted on the filtration tank 2 via a mounting base 104. When vibration is generated by the vibration generator 102, the vibration is propagated from the outer wall of the filtration tank 2 to the layer of filtration media 54, and causes the filtration media 54 to vibrate. As a result, contaminants, which are attached to the filtration media 54 separate therefrom. That is, the filtration media 54 is cleansed by the vibration. The vibration generation is performed during the backwash rinsing operation. That is, the vibration is generated while filtered water is being backwashed from the filtered water discharge pipe 46. The contaminants, which are separated from the filtration media 54, pass through the wire mesh 50, the filtration media 14, and are expelled through the raw water supply pipe.

Any vibration generator may be employed, as long as it provides vibrations of a frequency and an amplitude that are effective in separating contaminants from the filtration media 54. It is preferable that a plurality, for example, two or three, of vibration generators are provided at equidistant intervals along the outer periphery of the filtration tank 2, to cause the vibrations to propagate toward the center of the layer of filtration media 54. The vibration generator 102 may be used by itself, or used in combination with the cleansing water spraying pipes 58.

Figure 9:
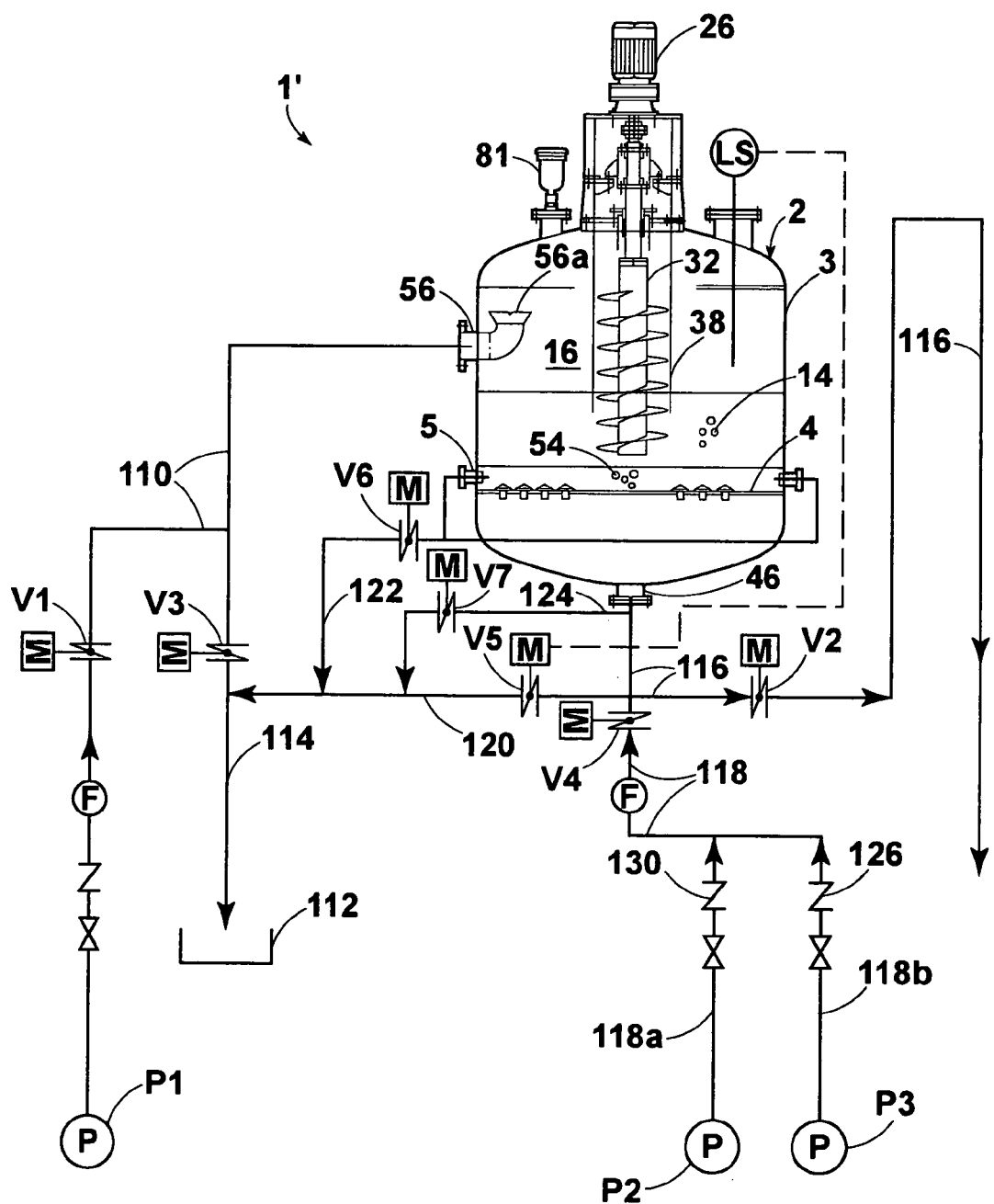
FIG. 9 is a schematic diagram of the entire filtration device of the present invention, illustrating the relationships of pipes, which are connected to the filtration tank.
Figure 10:
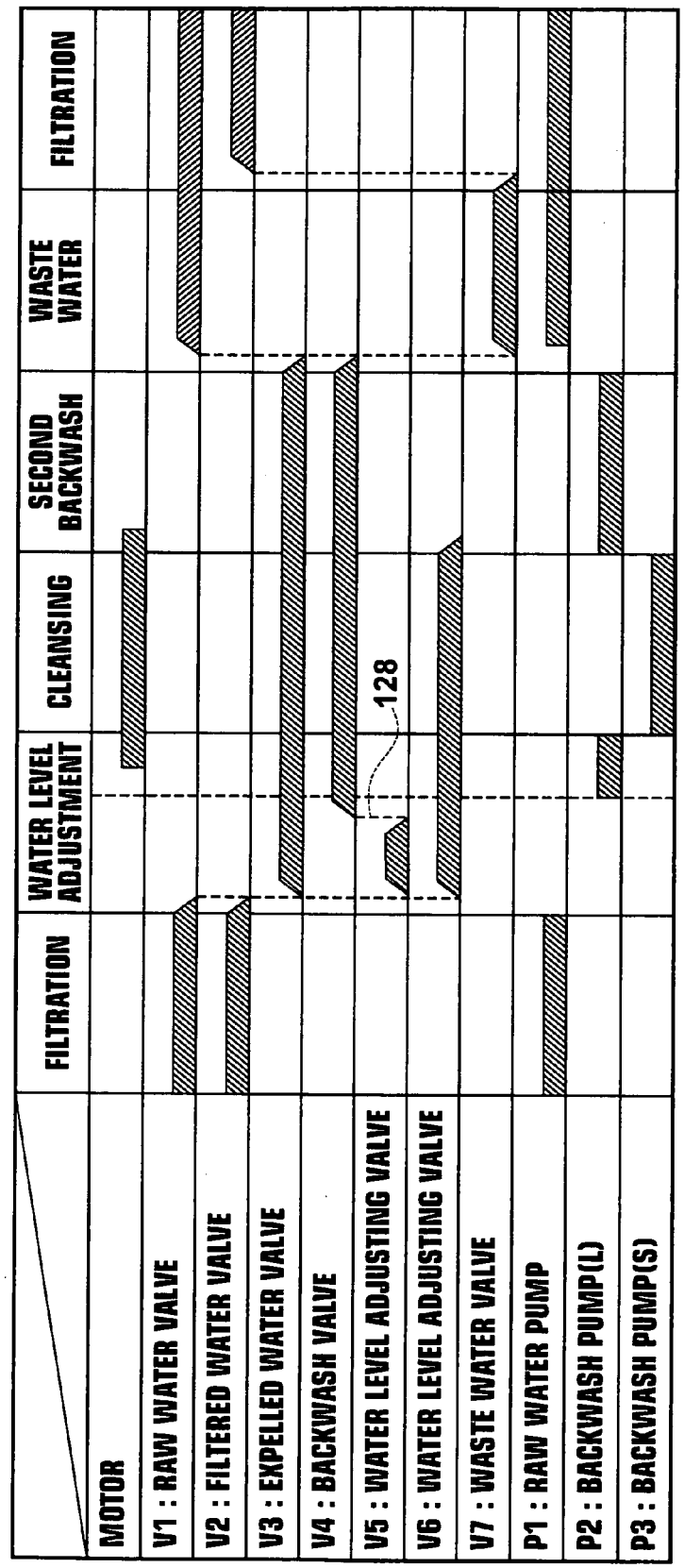
FIG. 10 is a timing chart that illustrates each of the steps taken from a filtration process to a cleansing process and back to the filtration process, as well as the relationships among the operation of each of the components of the filtration device.

Next, specific examples of each of the steps taken from a filtration process to a cleansing process and back to the filtration process, which are common to the first and second embodiments, will be described with reference to FIGS. 9 and 10. FIG. 9 is a schematic diagram of the entire filtration device 1' of the present invention, illustrating the relationships of pipes, which are connected to the filtration tank 2. FIG. 10 is a timing chart that illustrates each of the steps taken from a filtration process to a cleansing process and back to the filtration process, as well as the relationships among the operation of each of the components of the filtration device 1'.

First, with reference to FIG. 9, the connection relationships among each of the pipes and the filtration tank 2 will be described. A pipe 110, which is connected to a raw water pump PI, is connected to the raw water supply pipe 56 of the filtration tank 2. A raw water valve VI that opens and closes the flow path is mounted in the pipe 110. In addition, a pipe 114 that extends to an expelled water trough 112 is connected to the pipe 110. An expelled water valve V3 is provided in the pipe 114. A pipe 116, having a filtered water valve V2, is connected to the filtered water discharge pipe 46 at the center of the lower end of the filtration tank 2. Filtered water is discharged from the pipe 116. Note that each of the valves illustrated in FIG. 9 is driven by a motor, denoted by "M". In addition, flow meters, which are provided in flow paths, are denoted by "F".

A pipe 118, which is connected to backwash pumps P2 and P3, is connected to the pipe 116. A backwash valve V4 is mounted in the pipe 118. Pipes 118a and 118b are connected to a remote position of the pipe 118, and the backwash pumps P2 and P3 are respectively connected to the pipes 118a and 118b. A pipe 120, having a water level adjusting valve V5, links the pipe 116 and the pipe 114, to communicate the pipe 116 and the pipe 114 with each other. At least one discharge pipe 5 is provided on a side wall 3 of the filtration tank 2, at a position above the plates 4. A pipe 122, having a water level adjusting valve V6, is connected to the discharge pipe 5. The pipe 122 is connected with the pipe 120. In addition, a pipe 124, having a waste water valve V7, is provided between the pipe 116 and the pipe 120, to communicate the pipe 116 and the pipe 120 with each other.

Next, each of the steps taken from a filtration process to a cleansing process and back to the filtration process will be described. First, with reference to FIG. 10, the operating state of each component of the filtration device 1' during normal filtration will be described. Note that in FIG. 10, the hatched portions indicate that the corresponding component is in an operating state, and the horizontal lengths of the hatched portions represent the passage of time. As can be understood from FIG. 10, the raw water valve VI and the filtered water valve V2 are open during normal filtration, and the raw water pump PI is in an operating state. That is, with reference to FIG. 9, raw water 16 is supplied to the pipe 110 by the raw water pump PI, passes through the open raw water valve VI, and is supplied to the filtration tank 2 through the raw water supply pipe 56. The raw water 16, which is supplied to the filtration tank 2, passes through the layers of filtration media 14 and filtration media 54 to be filtered thereby, and is discharged from the filtered water discharge pipe 46. The discharged filtered water passes through the pipe 116, passes through the open filtered water valve V2, and is discharged. During filtration, the water level of the raw water 16 is higher than a supply opening 56a of the raw water supply pipe 56. The filtration tank 2 may be filled with the raw water 16.

Next, when switching from the normal filtration process to the cleansing process, the water level is adjusted in advance, as illustrated in FIG. 10. The water level adjusting process lowers the water level within the filtration tank 2, in order to effectively perform cleansing of the filtration media 14 and the filtration media 54. The raw water valve VI and the filtered water valve V2 are closed during the water level adjusting process. In addition, operation of the raw water pump PI is ceased. Thereby, the supply of raw water 16 is ceased, as well as discharge of filtered water. Therefore, the filtration tank 2 is in a state in which liquid, such as the raw water 16, is stored therein. The valves VI and V2 are driven by motors. Therefore, some amount of time is required for their operations to be completed.

Thereafter, the expelled water valve V3, the water level adjusting valve V5 and the water level adjusting valve V6 are opened substantially simultaneously. When the expelled water valve V3 is opened, raw water 16 positioned above the raw water supply pipe 56 passes through the pipe 110 and the pipe 114, to be expelled into the expelled water trough 112. In addition, when the water level adjusting valves V5 and V6 are opened, filtered water flows to the pipes 116 and 122 from the filtered water discharge pipe 46 and the discharge pipe 5, and is expelled into the expelled water trough 112 via the pipe 120 and the pipe 114.

As illustrated in FIG. 9, the water level adjusting valve V5 is electrically connected to a water level gauge "LS". The water level adjusting valve V5 is configured to be closed when the water level reaches a predetermined level. That is, the water level adjusting valve V5 is closed at the point in time indicated by broken line 128 in FIG. 10. Thereafter, filtered water is discharged in small amounts only through the water level adjusting valve V6. Note that air from the exterior is introduced into the filtration tank 2 through the air venting valve 81 during the reduction in water level. The introduction of air prevents a decrease in water level reduction speed, by preventing the interior of the filtration tank 2 from becoming a negative pressure zone. By simultaneously opening the expelled water valve V3, the water level adjusting valve V5 and the water level adjusting valve V6 in this manner, discharge of liquid can be performed expediently, for example, in approximately two minutes. The water level is capable of being rapidly and efficiently reduced. The reduced water level at this time is lower than that which is suitable for cleansing.

Next, as illustrated in FIG. 10, the backwash valve V4 is opened and the backwash pump P2 is operated immediately after the water level adjusting valve V5 is closed. That is, filtered water passes through the pipes 118a, 118 and 116 from the backwash pump P2, and enters the filtration tank 2 through the filtered water discharge pipe 46. The capacity of the backwash pump P2 is high. Therefore, the backwashed filtered water is sprayed into the filtration media 14 with great force, causing the filtration media 14 in the vicinity of the cleansing tank 38 to float. The process of causing the filtration media 14 is a primary backwash process. The motor 26 is driven to initiate rotation of the screw conveyor 32 after the backwash pump P2 is driven to reduce resistance against rotation of the screw conveyor 32, as illustrated in FIG. 10.

The motor 26 for rotating the screw conveyor 32 is driven approximately five seconds after drive of the backwash pump P2 is initiated. By driving the backwash pump P2, the water level within the filtration tank 2 rises, and reaches a level suitable for cleansing the filtration media 14 approximately 10 seconds after initiation of driving. The water level at this time is 10 cm to 20 cm above the surface of the layer of the filtration media 14. This water level is lower than the supply opening 56a of the raw water supply pipe 56, which prevents the filtration media from being expelled through the raw water supply pipe 56 during the cleansing operation, which will be described later.

As illustrated in FIG. 10, the cleansing process is initiated when the liquid within the filtration tank 2 reaches a certain water level. In this process, operation of the backwash pump P2 is ceased, and the backwash pump P3, which has a lower capacity than the backwash pump P2, is driven. The water level adjusting valve V6 remains open, and therefore the filtered water supplied by the backwash pump P3 is discharged from the discharge pipe 5. The filtered water discharged from the discharge pipe 5 passes through the water level adjusting valve V6 and is expelled into the expelled water trough 112. At this time, contaminants at the bottom portion of the filtration tank 2, and the contaminants separated from the filtration media 54 are expelled from the discharge pipe 5 along with the filtered water. The amount of filtered water supplied by the backwash pump P3 and the amount of liquid discharged through the water level adjusting valve V6 is substantially the same. The motor 26 is continuously driven during the cleansing process, and contaminants are separated from the filtration media 14 by scrubbing action, which is caused by rotation of the screw conveyor 32. The cleansing process is continued for approximately one minute.

Next, following the cleansing process, a process of rinsing the cleansed filtration media 14 and 54, that is, a secondary backwash process, is initiated. In this process, the expelled water valve V3 and the backwash valve V4 remain open, but the water level adjusting valve V6 is closed. The backwash pump P3 is ceased to be driven, and the high capacity backwash pump P2 is driven instead. Thereby, filtered water is again sprayed from the filtered water discharge pipe 46 into the filtration tank 2 with great force, and rinsing of the filtration media 14 and 54 begins. The motor 26 for rotating the screw conveyor 32 is ceased to be driven approximately five seconds after drive of the backwash pump P2 is initiated. The secondary backwash process is continued for approximately five minutes. The filtered water that flows into the filtration tank 2 from the backwash pump P2 passes through the raw water supply pipe 56, the pipes 110, and the pipe 114 to be expelled into the expelled water trough 112, along with contaminants that are caused to float due to the rinsing operation. At this time, the screw conveyor 32 is not being driven, therefore there is no possibility that the filtration media 14 is agitated and flows out from the raw water supply pipe 56.

When the rinsing process, that is, the secondary backwash process, is completed, a waste water process is initiated. In this process, the expelled water valve V3 and the backwash valve V4 are closed, and the backwash pump P2 is ceased to be driven. Thereby, the spraying of filtered water into the filtration tank 2, and the expulsion of filtered water containing contaminants through the raw water supply pipe 56 is ceased. Next, the raw water valve VI and the waste water valve V7 are opened, and the raw water pump PI is driven.

Thereby, raw water 16 is once again supplied into the filtration tank 2 from the raw water supply pipe 56. The filtered water within the filtration tank 2 passes through the filtered water discharge pipe 46, the pipe 124, the waste water valve V7, and is expelled into the expelled water trough via the pipe 120 and the pipe 114. Thereby, contaminants that float at the bottom of the filtration tank 2 can be expelled. The waste water process is continued for two to twenty minutes, depending on the purpose of the process.

What should be noted during the waste water process is that the amount of raw water 16 that flows in is substantially the same as the amount of water that flows out through the pipe 124, and that the raw water 16 is expelled comparatively slowly. This is because if the outflow rate of the raw water is too fast, in other words, 5 if the outflow is greater than the inflow, air bubbles are generated within the filtration media 14 due to negative pressure. If these air bubbles are generated, they will remain during the following filtration process, and there is a possibility that filtration by the filtration media 14 cannot be performed efficiently. The waste water process completely expels contaminants, sludge, and the like that remains in the filtration tank 2.

When the waste water process is completed, the operation of the filtration device returns to the filtration process. That is, after the waste water valve V7 is closed, the filtered water valve V2 is opened. The raw water valve VI remains open, and the raw water pump PI is continued to be driven, therefore the raw water 16 supplied from the raw water supply pipe 56 is expelled through the pipe 116.

Figure 11:
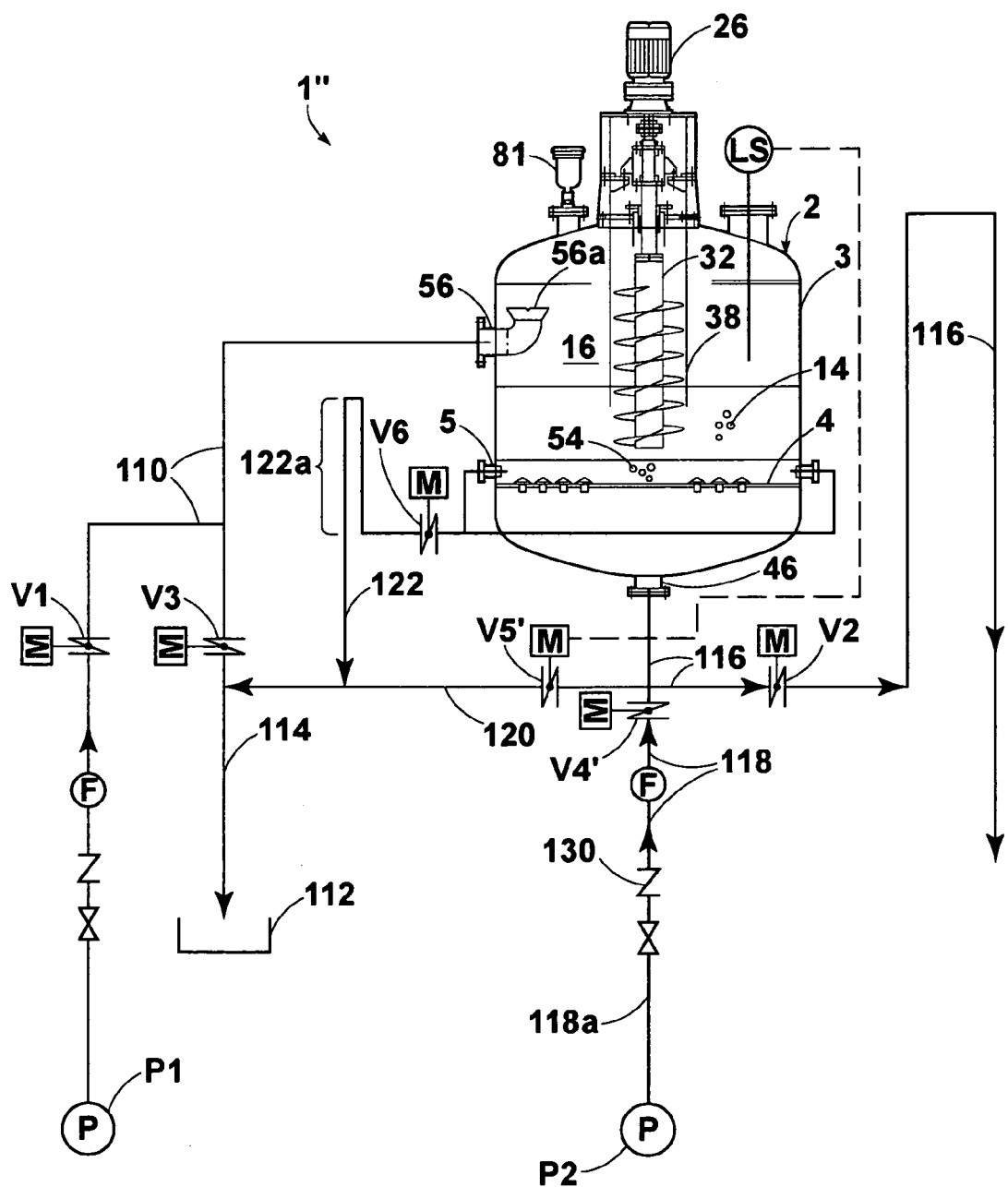
FIG. 11 is a schematic diagram of an entire filtration device similar to that of FIG. 9, illustrating the relationships of pipes, which are connected to the filtration tank.
Figure 12:
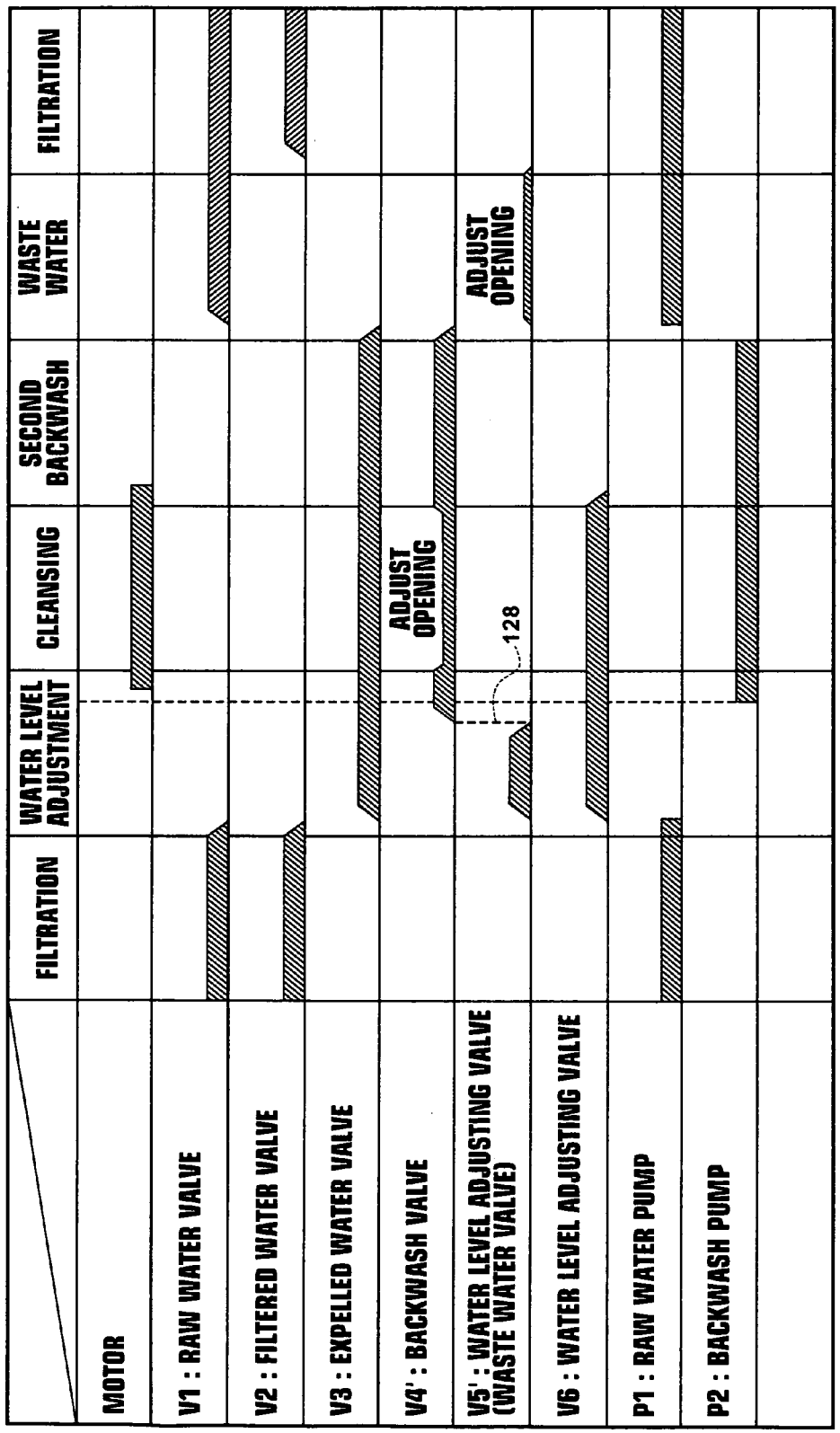
FIG. 12 is a timing chart that illustrates each of the steps taken from a filtration process to a cleansing process and back to the filtration process, as well as the relationships among the operation of each of the components of the filtration device of FIG. 11.

Next, other specific examples of each of the steps taken from a filtration process to a cleansing process and back to the filtration process, which are common to the first and second embodiments, will be described with reference to FIGS. 11 and 12. FIG. 11 is a schematic diagram of an entire filtration device 1" similar to the filtration device 1' of FIG. 9, illustrating the relationships of pipes, which are connected to the filtration tank 2. FIG. 12 is a timing chart similar to FIG. 10 that illustrates each of the steps taken from a filtration process to a cleansing process and back to the filtration process, as well as the relationships among the operation of each of the components of the filtration device 1" of FIG. 11. Note that in the description, components which are the same as those in FIG. 9 will be described utilizing the same reference numerals.

First, the connection relationships among each of the pipes and the filtration tank 2 that differ from those of FIG. 9 will be described, with reference to FIG. 11. In the filtration device 1" illustrated in FIG. 11, the waste water valve V7 and the backwash pump P3 of the filtration device 1' are eliminated, and the pipe 122 is formed erect. In addition, valves that are capable of adjusting the degrees of openings are utilized as a backwash valve V4' and a water level adjusting valve V5', thereby enabling adjustment of the flow rate therethrough. With regard to the other components, they are the same as those of the filtration device 1' of FIG. 9.

In further detail, only the high capacity backwash pump P2 is provided for the pipe 116, which is connected to the filtered water discharge pipe 46, and the low capacity backwash pump P3 is not utilized. Accordingly, only the pipe 118 and a check valve 130 are utilized. In addition, in the previous example, the pipe 124 having the waste water valve V7 was provided between the pipe 116 and the pipe 120. However, these components are not utilized in the present example.

The present example is the same as the previous example in that the pipe 122 having the water level adjusting valve V6 is connected to the discharge pipe 5, and the pipe 122 is connected to the pipe 120. However, the present example differs from the previous example in that the pipe 122 comprises an upwardly extending erect portion 122a. The uppermost portion of the erect portion 122a is set such that it is positioned at substantially the same position as a preferable water level in the filtration tank 2 during cleansing. Thereby, the water level during cleansing will always be maintained at this position. As described above, the present example reduces the initial investment cost in the filtration apparatus 1", by eliminating the backwash pump P3 and the waste water valve V7.

Next, each of the steps taken from a filtration process to a cleansing process and back to the filtration process will be described. First, with reference to FIG. 12, during normal filtration, the operations are the same as the previous example, in that the raw water valve VI and the filtered water valve V2 are open, and the raw water pump PI is in an operating state. That is, at this time, raw water 16 is being supplied to the filtration tank 2 from the raw water supply pipe 56. The raw water 16 supplied to the filtration tank 2 passes through the layers of filtration media 14 and filtration media 54 to be filtered thereby, and is discharged from the filtered water discharge pipe 46. The discharged filtered water passes through the pipe 116, passes through the open filtered water valve V2, and is discharged.

Next, when switching to the cleansing process from the normal filtration process, water level adjustment is performed in a similar manner as that of the previous example, as illustrated in FIG. 12. During the water level adjustment process, the raw water valve VI and the filtered water valve V2 are closed. In addition, the operation of the raw water pump PI is ceased. Therefore, the filtration tank 2 is in a state in which liquid, such as the raw water 16, is stored therein. Thereafter, the expelled water valve V3, the water level adjusting valve V5' and the water level adjusting valve V6 are opened substantially simultaneously. The raw water 16 passes through the pipe 110 and the pipe 114, to be expelled into the expelled water trough 112. The filtered water flows from the filtered water discharge pipe 46 and the discharge pipe 5, and is expelled into the expelled water trough 112 via the pipe 120 and the pipe 114. Then, as illustrated in FIG. 11, the water level adjusting valve V5' is closed when the liquid in the filtration tank 2 reaches a certain water level. That is, the water level adjusting valve V5' is closed at the point in time indicated by broken line 128 in FIG. 12. Thereafter, filtered water is discharged in small amounts only through the water level adjusting valve V6.

Immediately after the water level adjusting valve V5' is closed, the backwash valve V4 is opened, and the backwash pump P2 is driven, as illustrated in FIG. 12. That is, filtered water is supplied into the filtration tank 2 from the backwash pump P2 via the pipe 118a, the pipe 118, the pipe 116, and the filtered water discharge pipe 46. The capacity of the backwash pump P2 is high. Therefore, the backwashed filtered water is sprayed into the filtration media 14 with great force, causing the filtration media 14 in the vicinity of the cleansing tank 38 to float. The motor 26 is driven to initiate rotation of the screw conveyor 32 after the backwash pump P2 is driven in advance to reduce resistance against rotation of the screw conveyor 32, as illustrated in FIG. 12. This process is the same as that of the previous example.

The motor 26 for rotating the screw conveyor 32 is driven approximately one to twenty seconds after drive of the backwash pump P2 is initiated. By driving the backwash pump P2, the water level within the filtration tank 2 rises, and reaches a predetermined level suitable for cleansing the filtration media 14 approximately five to ten seconds after initiation of driving.

When the liquid reaches the predetermined water level, a cleansing process is initiated in a manner different from that of the previous example, as illustrated in FIG. 12. In this process, the high capacity backwash pump P2 is continued to be driven, because the low capacity backwash pump P3 is eliminated from the present example. However, because the amount of filtered water supplied by the backwash pump P2 is great, the degree of opening of the variable flow rate backwash valve V4' is adjusted, that is, narrowed, to decrease the discharge rate. In addition, the water level adjusting valve V6 remains open, and therefore the filtered water supplied by the backwash pump P2 is discharged from the discharge pipe 5.

The filtered water discharged from the discharge pipe 5 passes through the water level adjusting valve V6 and is expelled into the expelled water trough 112 via the pipe 122. The pipe 122 comprises the erect portion 122a, and therefore the water level of the liquid within the filtration tank 2 is automatically adjusted to a water level suitable for cleansing. That is, if the water level is lower than the uppermost portion of the erect portion 122a, water is not expelled, and if the water level is higher than the uppermost portion, water is automatically expelled along with contaminants, maintaining the water level to be substantially uniform. The motor 26 is continuously driven during the cleansing process. Thereby, contaminants are separated from the filtration media 14 by scrubbing action, which is caused by rotation of the screw conveyor 32 in the same manner as in the previous example.

Following the cleansing process, a process of rinsing the cleansed filtration media 14 and 54, that is, a backwash process, is initiated. In this process, the degree of opening of the backwash valve V4' is adjusted (increased), and a great amount of filtered water is supplied from the backwash pump P2 via the filtered water discharge pipe 46. Accordingly, the backwash pump P2 is driven continuously through the cleansing and the backwash processes. The expelled water valve V3 and the backwash valve V4 remain open, but the water level adjusting valve V6 is closed, in the same manner as in the previous example.

When the rinsing process, that is, the backwash process, is complete, a waste water process is initiated. Because the waste water valve V7 is eliminated from the present example, the variable flow rate water level adjusting valve V5' is utilized as a waste water valve. In this process, it is necessary to slowly expel filtered water in order to expel contaminants which are pooled at the bottom portion of the filtration tank 2. Therefore, the degree of opening of the water level adjusting valve V5' is narrowed, to expel the filtered water at a low flow rate. The operating states of components other than the water level adjusting valve V5', which is utilized as a waste water valve, are the same as those of the previous example.

When the waste water process is completed, the filtration device 1" returns to the normal filtration process. The operating states of the components at this time are the same as those of the previous example.

The processes performed by the filtration device have been described in detail above. However, the numerical values for time periods given in the description of each process are merely examples, and the processes are not limited to these time periods. For example, it is necessary to expend more time for each process in the case that the filtered water is to be utilized as drinking water, compared to a case in which the filtered water is applied to industrial use. In addition, the amount of time allotted for each process may be set freely by use of a timer. For example, in the embodiments described above, a timer may be set so that filtration is performed for a period of time within a range of 1 to 72 hours, cleansing is performed for a period of time within a range of 0 to 2 minutes, secondary backwash is performed for a period of time within a range 5 of 1 to 2 minutes, and waste water is performed for a period of time within a range of 1 to 30 minutes. In addition, each process may be executed automatically. Further, it goes without saying that the settable ranges of the time periods can be expanded for each of the processes.

The preferred embodiments of the present invention have been described above. However, the present invention is not limited to the above construction. For example, as a structure for supporting the lower end of the screw conveyor, a configuration different from that of the modification of FIGS. 13 and 14 may be adopted. That is, the lower end of the screw conveyor 44 may be formed as a conical shape, and a member having a recess for receiving the tip of the cone may be provided on a support beam of the wire mesh 50. This structure is capable of reducing axial displacement of the screw conveyor. In addition, this structure does not take away from the functions of the present invention.

In addition, glass beads, activated carbon particles, or the like may be employed as the filtration media 54. In the case that activated carbon particles are employed, there is a tendency for the particles to become fixed to each other from the surface through upper layer thereof during use. That is, the activated carbon particles accrete into continuous plates during use. If the activated carbon particles accrete into plates, the liquid to be filtered permeates downward through cracks in the plates and the like. However, a filtration effect is only obtained in the vicinity of the water paths. Therefore, even if the activated carbon positioned from the middle through lower layers still have adsorptive properties, the functions thereof cannot be sufficiently exhibited. For this reason, replacement, calcination, and regeneration of activated carbon particles had heretofore been indispensable.

By providing the cleansing mechanism of the present invention, activated carbon particles can be agitated and cleansed. Thereby, the accretion of activated carbon particles can be avoided. Accordingly, the entire layer of activated carbon particles is enabled to be effectively utilized. As a result, the performance of filtration devices that utilize activated carbon as filtration media is improved. In addition, contaminants, such as organic matter, which are attached to the surfaces of the activated carbon are separated therefrom during cleansing. Therefore, the intervals between replacement operations of the activated carbon can be significantly extended. Thereby, maintenance and management of the filtration device is facilitated, and costs associated therewith can be reduced.

It is preferable that the positions of the upper openings 42 are not too low. This is so that the filtration media 14 can be scrubbed over a long distance within the cleansing tank 38.

In the case that the diameters of the filtration tanks 2 and 202 are great, a plurality of cleansing tanks 38 and 238 may be provided therein. In this case, the filtration media 14 can be cleansed even more rapidly and efficiently.

Note that the embodiments described above may be utilized to filter waster fluids, oil, and the like, in addition to water.

What is claimed is:

1. A filtration device comprising:
a filtration tank, having an upper filtration media support member and a lower filtration media support member which are vertically separated, the upper filtration media support member supporting a layer of first particulate filtration media; and
a cleansing mechanism, comprising:
a vertically oriented hollow cleansing tank provided in the filtration tank;
a cleansing means, for conveying the first filtration media upwards within the cleansing tank while cleansing the first filtration media;
a contaminant expulsion means, for expelling contaminants separated from the first filtration media during cleansing to the exterior of the filtration tank; wherein:
during normal filtration, liquid which has been filtered by the filtration media is passed through the upper filtration media support member and the lower filtration media support member and discharged therethrough;
the upper filtration media support member comprises a great number of liquid passage portions, of a size which is difficult for the first filtration media to pass through; and
a layer of second filtration media, which are greater in size than the first filtration media, is provided between the upper filtration media support member and the lower filtration media support member; and
liquid spraying pipes, for spraying the second filtration media from the exterior, provided on the outer wall of the filtration tank,
wherein a cleansing fluid is sprayed toward the layer of the second filtration media by the liquid spraying pipes, to separate contaminants attached to the second filtration media by the stream of cleansing fluid.

2. A filtration device as defined in claim 1, wherein:
the cleansing means comprises a screw conveyor, which is suspended from the upper portion of the filtration tank; and
the screw conveyor is configured to be rotated by a drive portion, which is provided at the upper portion of the filtration tank.

3. A filtration device as defined in claim 1, wherein:
the upper filtration media support member is a mesh member, having mesh openings that constitute the liquid passage portions.

4. A filtration device as defined in claim 1, wherein:
a plurality of strainers, for discharging the filtered liquid, are provided at the lower filtration media support member.

5. A filtration device as defined in claim 1, further comprising:
a vibration generating device, for imparting vibration to the second filtration media provided between the upper filtration media support member and the lower filtration media support member; wherein:
vibration is propagated toward the layer of the second filtration media by the vibration generating device, to separate contaminants attached to the second filtration media by the vibration imparted thereto.

* * * * *